United States Patent
Cox-Muranami et al.

(10) Patent No.: US 12,011,713 B2
(45) Date of Patent: Jun. 18, 2024

(54) SYSTEM AND METHOD FOR SEQUESTERED WASH BUFFER REUSE

(71) Applicant: Illumina, Inc., San Diego, CA (US)

(72) Inventors: Wesley A. Cox-Muranami, San Diego, CA (US); Kay Klausing, San Diego, CA (US); Bradley Kent Drews, Poway, CA (US); Nicholas Watson, San Diego, CA (US); Jennifer Olivia Foley, San Diego, CA (US); Murphy Hitchcock, San Diego, CA (US); Paul Sangiorgio, San Diego, CA (US); Sz-Chin Steven Lin, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 17/817,204

(22) Filed: Aug. 3, 2022

(65) Prior Publication Data
US 2022/0371005 A1    Nov. 24, 2022

Related U.S. Application Data

(62) Division of application No. 16/584,353, filed on Sep. 26, 2019, now Pat. No. 11,426,723.
(Continued)

(51) Int. Cl.
*B01L 3/00* (2006.01)

(52) U.S. Cl.
CPC ......... *B01L 3/502* (2013.01); *B01L 2200/141* (2013.01); *B01L 2200/16* (2013.01);
(Continued)

(58) Field of Classification Search
CPC ..... B01L 2400/0644; B01L 2400/0487; B01L 2300/06; B01L 2300/047; B01L 2200/16; B01L 2200/141; B01L 3/502
See application file for complete search history.

(56) References Cited

U.S. PATENT DOCUMENTS

| | | |
|---|---|---|
| 7,244,961 B2 | 7/2007 | Jovanovich |
| 8,900,828 B2 | 12/2014 | Smith et al. |

(Continued)

FOREIGN PATENT DOCUMENTS

| | | |
|---|---|---|
| CN | 102707078 A | 10/2012 |
| CN | 103459035 A | 12/2013 |

(Continued)

OTHER PUBLICATIONS

Chinese Office Action dated Feb. 5, 2024 in related Chinese patent application No. 201910951497.8 (22 pages).

*Primary Examiner* — Matthew D Krcha
*Assistant Examiner* — Tingchen Shi
(74) *Attorney, Agent, or Firm* — Rothwell, Figg, Ernst & Manbeck, P.C.

(57) ABSTRACT

A system includes a fluidic device, a flow control valve, a first reagent fluid reservoir fluidly connectable to the fluidic device by the flow control valve, a first fluid buffer reservoir fluidly connectable to the fluidic device by the flow control valve, and a common fluid buffer source fluidly connectable to the fluidic device by the flow control valve. The flow control valve permits flow comprising: (i) flow from the first reagent fluid reservoir to the fluidic device, (ii) flow from the common fluid buffer source to the fluidic device, (iii) flow from the fluidic device to the first fluid buffer reservoir, (iv) flow from the first reagent fluid reservoir to the fluidic device, and (v) flow from the first fluid buffer reservoir to the fluidic device.

17 Claims, 21 Drawing Sheets

Related U.S. Application Data

(60) Provisional application No. 62/741,812, filed on Oct. 5, 2018.

(52) U.S. Cl.
CPC ..... *B01L 2300/047* (2013.01); *B01L 2300/06* (2013.01); *B01L 2400/0487* (2013.01); *B01L 2400/0644* (2013.01)

(56) References Cited

U.S. PATENT DOCUMENTS

| | | |
|---|---|---|
| 9,096,899 B2 | 8/2015 | Eltoukhy |
| 9,410,977 B2 | 8/2016 | Stone et al. |
| 9,650,669 B2 | 5/2017 | Buermann et al. |
| 10,549,281 B2 | 2/2020 | Buermann |
| 2006/0177844 A1* | 8/2006 | Ching ................. C12Q 1/6844 435/6.12 |
| 2006/0222569 A1 | 10/2006 | Barten et al. |
| 2013/0000417 A1 | 1/2013 | Hanko et al. |
| 2014/0017687 A1 | 1/2014 | Wimberger-Friedl et al. |
| 2014/0377759 A1 | 12/2014 | Van Atta et al. |
| 2015/0045234 A1 | 2/2015 | Stone |
| 2016/0319350 A1 | 11/2016 | Stone et al. |
| 2017/0138972 A1 | 5/2017 | Johno et al. |
| 2017/0144155 A1 | 5/2017 | Bohm et al. |
| 2018/0188281 A1 | 7/2018 | Drews |

FOREIGN PATENT DOCUMENTS

| | | |
|---|---|---|
| CN | 204832037 U | 12/2015 |
| CN | 105408466 A | 3/2016 |
| CN | 206553528 U | 10/2017 |
| CN | 108474805 A | 8/2018 |
| CN | 110178036 A | 8/2019 |
| CN | 211235903 U | 8/2020 |
| EP | 2143491 | 1/2010 |

\* cited by examiner

SYSTEM AND METHOD FOR SEQUESTERED WASH BUFFER REUSE

CROSS REFERENCE TO RELATED APPLICATION

This application is a divisional application claiming the benefit under 35 U.S.C. §§ 120, 121 of the filing date of non-provisional patent application Ser. No. 16/584,353 filed Sep. 26, 2019, which claims the benefit under 35 U.S.C. § 119(e) of the filing date of provisional patent application Ser. No. 62/741,812 filed Oct. 5, 2018, the disclosure of which is incorporated herein by reference.

BACKGROUND

Various assay protocols for clinical and molecular processes are implemented in systems that include fluid handling equipment to deliver various types of reagent fluids held in one or more reagent storage components to a reagent destination to conduct one or more fluid operations, such as mixing, processing, reaction, detection, etc. Typically, after each fluid operation, a fluid buffer solution is introduced through the fluidic device to flush out any unused reagent molecules remaining from the previous fluid operation, thereby ensuring that the reagent fluid used in the next fluid operation is not contaminated by remnant reagent molecules. To have a sufficient amount of fluid buffer to flush the fluidic device after each fluid operation, systems, in particular the fluidic cartridge, typically house large volumes of fluid buffer. Housing large volumes of fluid buffer, however, can be cumbersome as fluid cartridges are limited in space availability as size reduction is pursued. Moreover, housing large volumes of fluid buffer increases the costs of conducting the various fluid operations.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure encompass a method comprising: a step (a) of moving an aliquot of first reagent fluid into a fluidic device; (b) after step (a), moving a volume of fluid buffer into the fluidic device; (c) after step (b), moving at least a portion of the volume of fluid buffer moved in step (b) into a first fluid buffer reservoir; (d) after step (c), moving an aliquot of second reagent fluid into the fluidic device; (e) after step (d), moving a volume of fluid buffer into the fluidic device; and (f) after step (e), moving at least a portion of the volume of fluid buffer moved in step (e) into a second fluid buffer reservoir.

Aspects of the disclosure encompass a system comprising: a fluidic device, a flow control valve, a first reagent fluid reservoir fluidly connectable to the fluidic device by the flow control valve, a first fluid buffer reservoir fluidly connectable to the fluidic device by the flow control valve, and a common fluid buffer source fluidly connectable to the fluidic device by the flow control valve. In some examples, the flow control valve permits flow comprising: (i) flow from the first reagent fluid reservoir to the fluidic device, (ii) flow from the common fluid buffer source to the fluidic device, (iii) flow from the fluidic device to the first fluid buffer reservoir, (iv) flow from the first reagent fluid reservoir to the fluidic device, and (v) flow from the first fluid buffer reservoir to the fluidic device.

Aspects of the disclosure encompass a computer readable medium encoded with computer-executable instructions that, when executed by a computer controller of an automated system, causes the system to execute the following system processes: (a) move an aliquot of first reagent fluid into a fluidic device; (b) after process (a), move a volume of fluid buffer into the fluidic device; (c) after process (b), move at least a portion of the volume of fluid buffer moved in process (b) into a first fluid buffer reservoir; (d) after process (c), move an aliquot of second reagent fluid into the fluidic device; (e) after process (d), move a volume of fluid buffer into the fluidic device; and (f) after process (e), move at least a portion of the volume of fluid buffer moved in process (e) into a second fluid buffer reservoir.

Other features and characteristics of the subject matter of this disclosure, as reservoir as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

DETAILED DESCRIPTION

Figure 1:
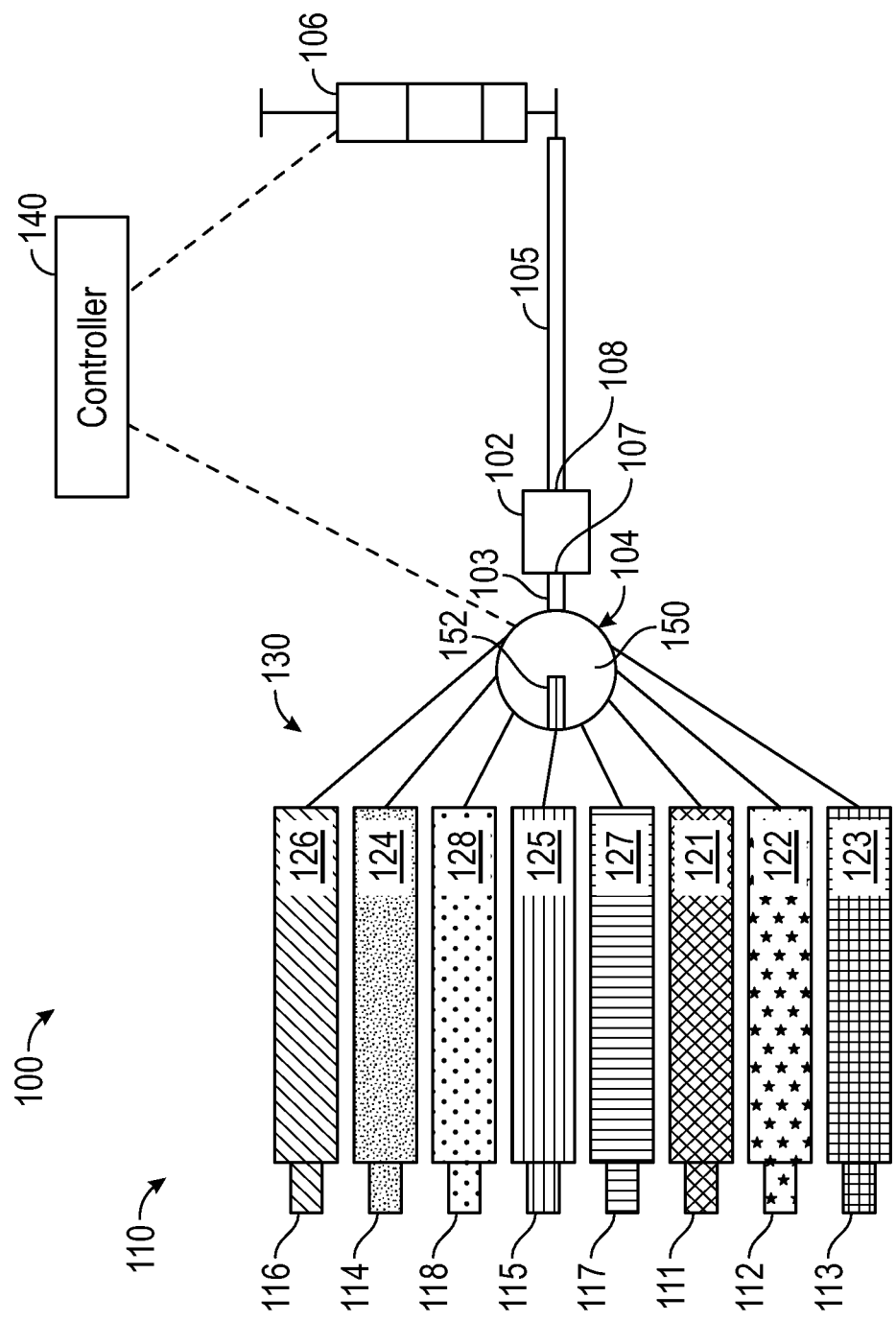
FIG. 1 is a schematic view of an exemplary system for sequestering and reusing two or more reagent fluids and fluid buffers through a fluidic device.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as reservoir as instances in which the event, circumstance, characteristic, or property occurs to a close approximation, such as accounting for typical tolerance levels or variability of the examples described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

A "reagent" as used herein refers to any substance or combination thereof that participates in a molecular assay, other than sample material and products of the assay. Exemplary reagents include nucleotides, enzymes, amplification oligomers, probes, and salts.

The term "buffer" as used herein refers to any solution with a controlled pH that may serve to dissolve a solid (e.g., lyophilized) substance (e.g., reagent, sample, or combination thereof) or as a diluent to dilute a liquid (e.g., a liquid reagent, liquid sample, or combination thereof; or a solution of a reagent, sample, or combination thereof).

According to various examples, assemblies and devices as described herein may be used in combination with a fluid cartridge that may comprise one or more fluid processing passageways including one or more elements, for example, one or more of a channel, a branch channel, a valve, a flow splitter, a vent, a port, an access area, a via, a bead, a reagent containing bead, a cover layer, a reaction component, any combination thereof, and the like. Any element may be in fluid communication with another element.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a burstable valve, or otherwise opening a valve disposed in the fluid processing passageway.

Fluidic System

While reusing fluid buffer after being flushed through the fluidic device curtails the amount of fluid buffer needed for a fluid sequence process, used fluid buffer typically includes remnants of the active reagent since sequencing procedures can instruct fluid handling equipment to introduce fluid buffers into the fluidic device directly after introducing the active reagent through the fluidic device. Consequently, mixing reused fluid buffer with other fluid operations of the sequence process can further contaminate the fluid buffer supply to the fluidic device and/or compromise the integrity of the fluid operations by inadvertently introducing remnant reagents from a prior fluid operation from the reused fluid buffer.

Thus, there is a need for improved fluidic systems and methods that allow fluid buffer to be both sequestered and reused in a sequencing process to avoid contamination and reduce the volume of fluid buffer needed to be stored by the fluidic cartridge to conduct a fluid sequence process.

According to various examples, a system is configured to sequester and reuse reagent fluids and fluid buffers directed through a fluidic device by comprising one common fluid buffer reservoir to hold fresh, unused fluid buffer and at least one dedicated fluid buffer reservoir dedicated to holding fluid buffer that has been used to flush each different reagent through the fluidic device. The system may further comprise a flow control valve operatively associated with the common fluid buffer and the at least one dedicated fluid buffer reservoir to selectively fluidly connect any one of the common fluid buffer reservoir and the at least one dedicated fluid buffer reservoir to the fluidic device during a wash operation. Accordingly, by sequestering and reusing fluid buffer through the use of one or more dedicated fluid buffer reservoirs, the system minimizes the volume of fluid buffer used in a fluid process, such as a fluid sequencing operation, for example a sequencing-by-synthesis (SBS) operation that includes a cleave process, a scavenger process, an incorporation process, and a scan process interposed by one or more wash operations.

FIGS. 1-19 show an example system 100 for sequestering and reusing reagent fluid and fluid buffer during two or more fluid operations. In some examples, the system 100 comprises a fluidic device 102, an inlet channel 103, a flow control valve 104, an outlet channel 105, a pump 106, a set of fluid reservoirs 110, and a set of connecting channels 130. In some examples, the system 100 is part of a fluid cartridge (not shown) supporting various components of the system 100, such as, the fluidic device 102, the flow control valve 104, the pump 106, and the set of fluid reservoirs 110, although one or more components of the system 100 may not be supported on a common fluid cartridge or other supporting structure.

As shown in FIG. 1, the fluidic device 102 (e.g., flow cell) is fluidly connected to the flow control valve 104 by the inlet channel 103. In one example, the fluidic device 102 is a flow cell comprising a first glass layer (not shown) and a second glass layer (not shown) secured together and defining one or more channels (not shown) therein that can be fluidically manipulated and optically detected. In various examples, the fluidic device 102 may include a fluid inlet 107, a fluid outlet 108, and one or more fluid channels (not shown) are fluidly connected to the fluid inlet and the fluid outlet to allow fluid processing, such as a chemical or biochemical assay or other process or reaction, to take place. In various examples, the fluidic device 102 is configured to allow the introduction of various types of fluids (e.g., reagents, buffers, reaction media) into the fluid inlet 107 to undergo fluid processing within the one or more fluid channels. In various examples, fluidic device 102 is further configured to allow the various types of fluids to be flushed out of the one or more fluid channels through the fluid outlet 108.

In the example shown in FIGS. 1-19, the inlet channel 103 fluidly connects the fluid inlet 107 of the fluidic device 102 to the flow control valve 104, and the outlet channel 105 fluidly connects the fluid outlet 108 of the fluidic device 102 to the pump 106. In other examples (not shown), the system 100 may include two or more channels to fluidly connect the fluidic device 102 to the flow control valve 104 and two or more channels to fluidly connect the fluidic device 102 to the pump 106.

In some examples, the set of fluid reservoirs 110 comprises two or more reagent fluid reservoirs 112, 114, 116, and/or 118. In the example shown in FIG. 1, the two or more reagent fluid reservoirs includes a first reagent fluid reservoir 112, a second reagent fluid reservoir 114, a third reagent fluid reservoir 116, and a fourth reagent fluid reservoir 118, although any number of reagent fluid reservoirs is contemplated by this disclosure. The different reagent fluid reservoirs 112, 114, 116, and/or 118 of the set of fluid reservoirs 110 may have the same or varying sizes (i.e., volumes)—e.g., all reagent fluid reservoirs 112, 114, 116, and 118 may have the same volume, all reagent fluid reservoirs 112, 114, 116, and 118 may have different volumes, or a subset of the reagent fluid reservoirs 112, 114, 116, and/or 118 may have the same volume and a subset of the reagent reservoirs 112, 114, 116, and/or 118 may have different volumes—depending on the necessary storage volume of the reagent to be stored in each reagent fluid reservoir.

In some examples, the first reagent fluid reservoir 112 holds a first reagent fluid 122 comprising a solvent and a first reagent directed to a first reagent operation (e.g., cleave). In some examples, the second reagent fluid reservoir 114 holds a second reagent fluid 124 comprising a solvent and a second reagent directed to a second reagent operation (e.g., scan). In some examples, the third reagent fluid reservoir 116 holds a third reagent fluid 126 comprising a solvent and a third reagent directed to a third reagent operation (e.g., incorporation). In some examples, the fourth reagent fluid reservoir 118 holds a fourth reagent fluid 128 comprising a solvent and a fourth reagent directed to a fourth reagent operation (e.g., scavenger).

In some examples, the set of fluid reservoirs 110 comprises two or more fluid buffer reservoirs 111, 113, 115, and/or 117. In the example shown in FIG. 1, the two or more fluid buffer reservoirs includes a common fluid buffer source or reservoir 111 and at least one dedicated fluid buffer reservoir 113, 115, and/or 117, each associated with one of the reagent fluids 122, 124, 126, and/or 128. In the examples shown in FIGS. 1-19, the at least one dedicated fluid buffer reservoir comprises a first fluid buffer reservoir 113, a second fluid buffer reservoir 115, and/or a third fluid buffer reservoir 117, although any number of dedicated fluid buffer reservoirs is contemplated by this disclosure. The different fluid buffer reservoirs 111, 113, 115, and/or 117 of the set of reservoirs 110 may have the same or varying sizes (i.e., volumes)—e.g., all fluid buffer reservoirs 111, 113, 115, and/or 117 may have the same volume, all fluid buffer reservoirs 111, 113, 115, and/or 117 may have different volumes, or a subset of the fluid buffer reservoirs 111, 113, 115, and/or 117 may have the same volume and a subset of the fluid buffer reservoirs 111, 113, 115, and/or 117 may have different volumes—depending on the necessary storage volume of the reagent to be stored in each reagent fluid reservoir.

In some examples, each of the dedicated fluid buffer reservoirs 113, 115, and/or 117 holds a volume of fluid that is at least 30% of a volume of fluid held by the fluidic device 102. In some examples, each of the dedicated fluid buffer reservoirs 113, 115, and/or 117 is a cache channel comprising a consistent cross-sectional dimension across a length thereof. In some examples, each of the dedicated fluid buffer reservoirs 113, 115, and/or 117 is a cache well comprising a cross-sectional dimension larger than a cross-sectional dimension of its associated connecting channel 130. In some examples, the cache-well does not include any sharp edges or various topographical features and is configured to minimize bubble nucleation such that the cache-well does not accumulate bubbles as fluid is pushed in and out of the reservoir.

In the examples shown in FIGS. 1-19, the common fluid buffer reservoir 111 holds a common fluid buffer 121 (e.g., wash solution that includes salt-water and soap) that has not been flushed through the fluidic device 102. In various examples, each of the dedicated buffer reservoirs 113, 115, and/or 117 holds a sequestered fluid buffer that has been flushed through the fluidic device 102 following a reagent operation conducted in the fluidic device 102, e.g., with one of the reagent fluids 122, 124, and/or 126, although initially before any reagent operations have occurred, the dedicated fluid buffer reservoirs 113, 115, and/or 117 may hold unused fluid buffer.

Figure 6:
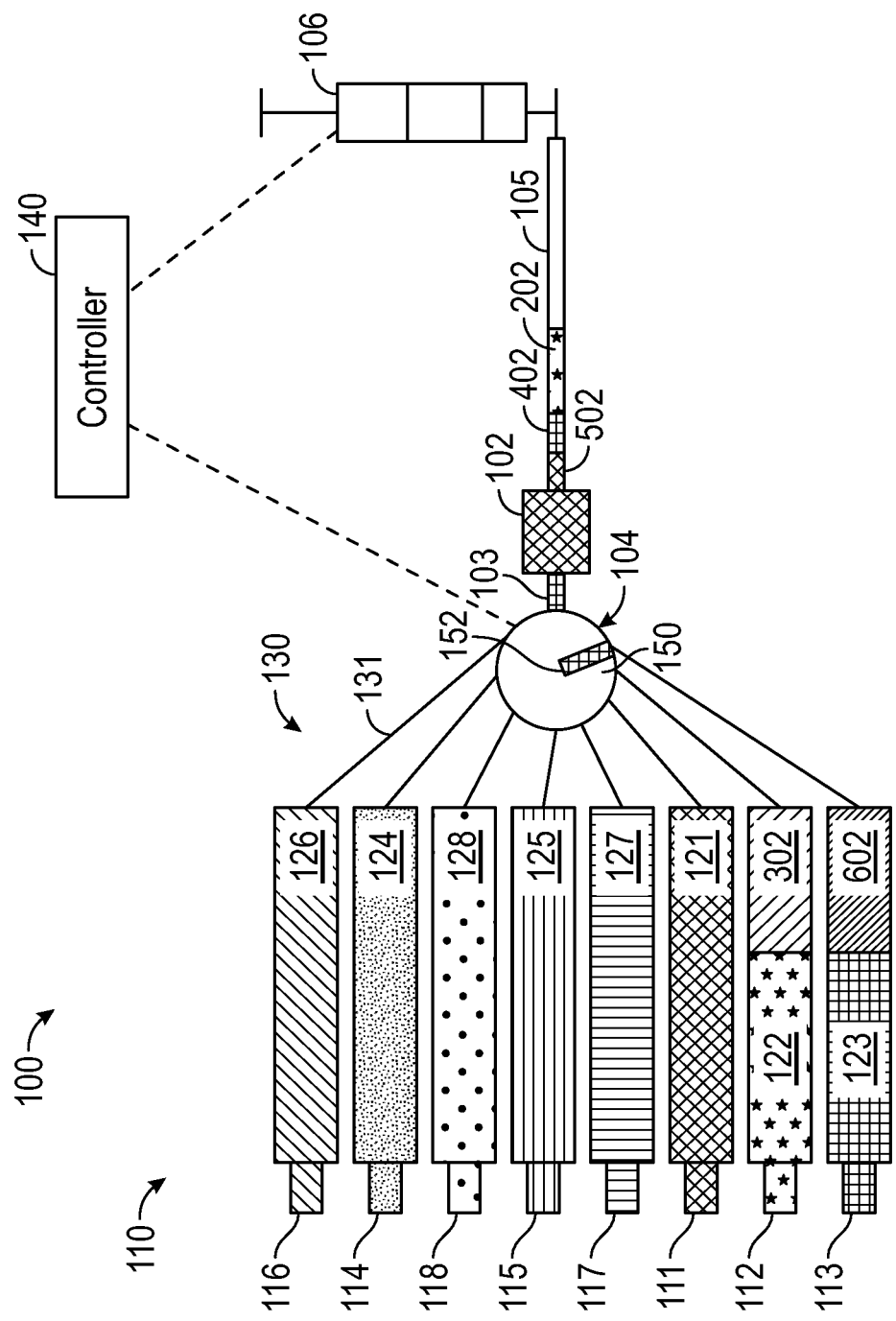
FIG. 6 is a schematic view of the system performing a first buffer reverse.

In the examples shown in FIG. 6, the first buffer reservoir 113 holds a first fluid buffer 123 that includes a mixture of used fluid buffer 602 that has been flushed through the fluidic device 102 after the first reagent fluid 122 has been directed through the fluidic device 102 during the first reagent operation. In the examples shown in FIG. 11, the second buffer reservoir 115 holds a second fluid buffer 125 that includes a mixture of used fluid buffer 1102 that has been flushed through the fluidic device 102 after the second reagent fluid 124 has been directed through the fluidic device 102 during the second reagent operation. In the examples shown in FIG. 16, the third buffer reservoir 117 holds a third fluid buffer 127 that includes a mixture of used fluid buffer 1602 that has been flushed through the fluidic device 102 after the third reagent fluid 126 has been directed through the fluidic device 102 during the fourth reagent operation.

In some examples, the system may not include a dedicated fluid buffer reservoir for every reagent. For example, system and processes shown in FIGS. 1-20 do not include a dedicated fluid buffer reservoir associated with the fourth reagent fluid 128, other example systems and processes may include a dedicated fluid buffer reservoir associated with the every reagent fluid.

In the example shown in FIGS. 1-19, the set of connecting channels 130 comprises a respective connecting channel 131 extending from its associated fluid reservoir 111, 112, 113, 114, 115, 116, 117, or 118 to the flow control valve 104, such that the flow control valve 104 is fluidly connected to each fluid reservoir 111, 112, 113, 114, 115, 116, 117, or 118 of the set of fluid reservoirs 110. In other examples (not shown), the set of connecting channels 130 may include two or more channels to fluidly connect a respective fluid reservoir 111, 112, 113, 114, 115, 116, 117, or 118 to the flow control valve 104, such as a front connecting channel (such as the respective connecting channel 131 shown) and a rear connecting channel (not shown) such that the used fluid buffer can be recycled to the rear of the respective fluid reservoir 111, 112, 113, 114, 115, 116, 117, or 118, opposite the front connecting channel.

Flow control valve 104 is constructed and arranged to selectively, fluidly connect one of the fluid reservoirs 111, 112, 113, 114, 115, 116, 117, or 118 of the set of fluid reservoirs 110 to the inlet channel 103, and thus, to the fluidic device 102. According to various examples, the flow control valve 104 comprises a rotary valve for selectively connecting to one of the connecting channels 131 for a respective fluid reservoir 111, 112, 113, 114, 115, 116, 117, or 118.

In the example shown in FIGS. 1-19, the flow control valve 104 is a rotary valve comprising a rotary body 150 and valve selector channel 152. In some examples, the rotary body 150 is configured to rotate between a plurality of angular positions so that the valve selector channel 152 may fluidly connect any one of the fluid reservoirs 111, 112, 113, 114, 115, 116, 117, or 118 to a valve outlet port via a respective inlet port for each fluid reservoir. When the rotary body 150 is rotated to an angular position such that the valve selector channel 152 is aligned with the one of the inlet ports for a selected fluid reservoir 111, 112, 113, 114, 115, 116, 117, or 118, fluid may flow from the selected reservoir 111, 112, 113, 114, 115, 116, 117, or 118, through the valve selector channel 152, and into the valve outlet port.

In other examples (not shown), the flow control valve 104 may include any other type of valve to selectively, fluidly connect one of the fluid reservoirs 111, 112, 113, 114, 115, 116, 117, or 118 to the inlet channel 103. In other examples (not shown), the flow control valve 104 may include a valve array, such as a plurality of pinch valves or solenoid valves and a manifold, to selectively, fluidly connect one of the fluid reservoirs 111, 112, 113, 114, 115, 116, 117, or 118 to the inlet channel 103.

In various examples, the pump 106, fluidly connected to the outlet channel 105, is configured to apply a pressure differential between any one 111, 112, 113, 114, 115, 116, 117, or 118 of the first set of fluid reservoirs 110 and the outlet channel 105 to propel fluid flow bi-directionally along a respective connecting channel 131 of the set of connecting channels 130, the flow control valve 104, inlet channel 103, the fluidic device 102, and the outlet channel 105. Pump 106 may comprise a syringe pump with an actuator (not shown) operatively associated with the syringe. In various examples, the actuator is configured to move a plunger of the syringe in a first direction to generate a negative pressure differential to draw fluid through the fluidic device 102 toward (and possibly into) a barrel of the syringe. The actuator is further configured to move the plunger in a second direction, opposite to the first direction, to generate a positive pressure differential and expel fluid away from (and possible out of) the syringe toward a selected reservoir 111, 112, 113, 114, 115, 116, 117, or 118 of the set of fluid reservoirs 110. Accordingly, by moving in a second direction to generate a positive pressure differential, the pump 106 is configured to expel fluid held in the fluidic device 102 or the outlet channel 105 though the inlet channel 103, the flow control valve 104, a selected connecting channel 131, and into one of the selected fluid reservoirs 111, 112, 113, 114, 115, 116, 117, or 118.

In other examples (not shown), the pump 106 may comprise any other pressure differential creating mechanism that is capable of reversing flow direction.

Fluid Sequence Operation of the System

In various examples, as shown in FIGS. 2-19, the system 100 sequesters and reuses reagent fluids and fluid buffers by: (i) selectively directing reagent fluids from any one of the reagent fluid reservoirs 112, 114, 116, and/or 118 to the fluidic device 102 to perform a reagent operation; (ii), optionally, redirecting at least a portion of a used reagent fluid 302, 802, 1302, and/or 1802 directed through the fluidic device 102 to the selected reagent fluid reservoir 112, 114, 116, and 118 to be reused for a subsequent reagent operation; (iii) selectively directing fluid buffers from any of the fluid buffer reservoirs 111, 113, 115, and/or 117 to the fluidic device 102 to conduct a wash operation; and (iv) redirecting at least a portion of a used fluid buffer 602, 1102, and/or 1602 directed through the fluidic device 102 back to one of the dedicated fluid buffer reservoirs 113, 115, and/or 117 to be reused for a subsequent wash operation.

Figure 2:
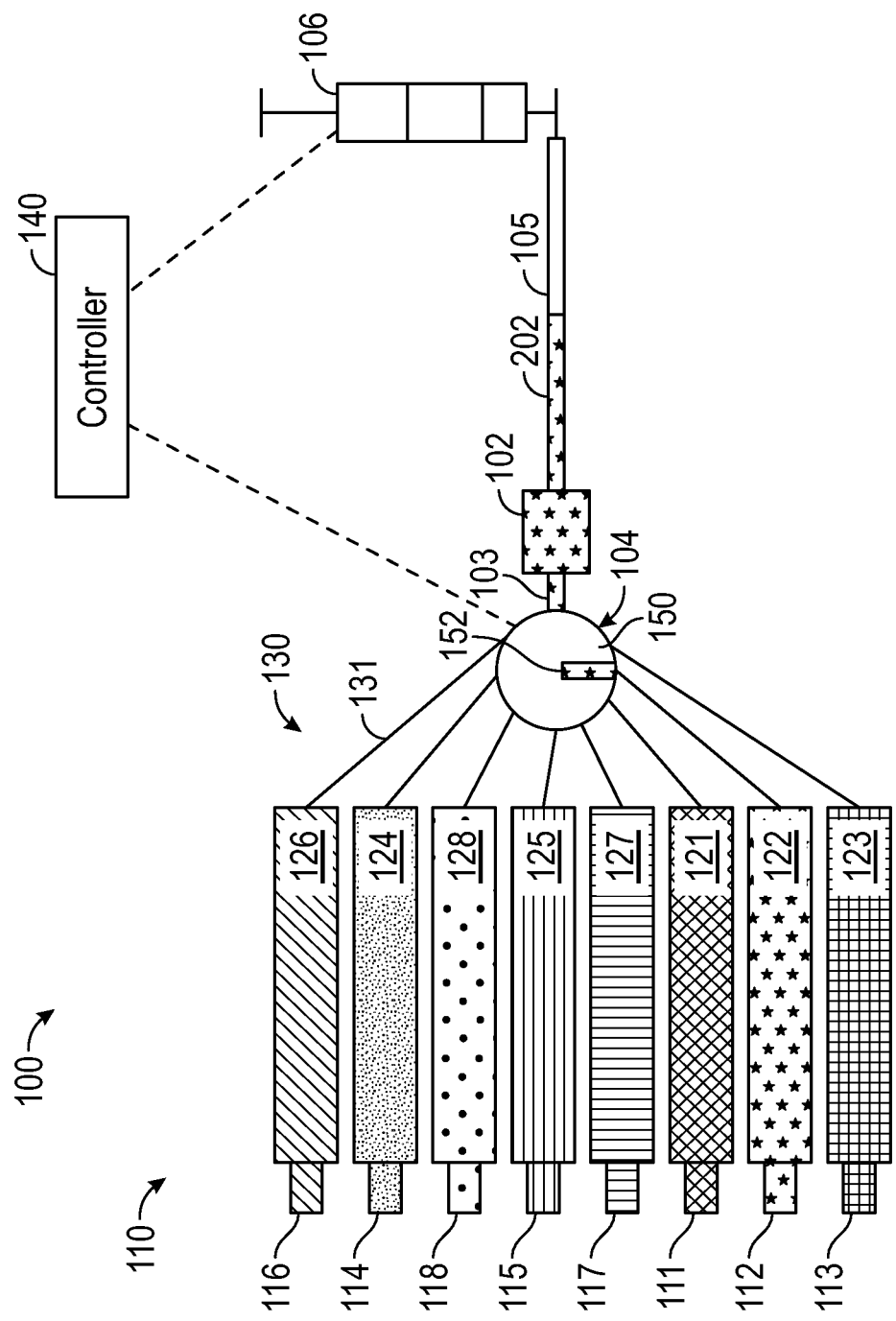
FIG. 2 is a schematic view of the system performing a first reagent operation.

Referring to FIG. 2, the system 100 may be set to perform a first reagent operation, such that flow control valve 104 permits fluid flow from the selected first reagent fluid reservoir 112 of the set of reservoirs 110 to the fluidic device 102. During the first reagent operation, the flow control valve 104 is set to connect the first reagent fluid reservoir 112 to the fluidic device 102 (e.g., by connecting valve selector channel 152 with a corresponding connecting channel 131 associated with the first reagent fluid reservoir 112). The pump 106 is operated to draw the first reagent fluid 122 from the first reagent fluid reservoir 112 through the flow control valve 104 and into the fluidic device 102. As shown in FIG. 2, an aliquot 202 of the first reagent fluid 122 is moved through the corresponding connecting channel 131, the flow control valve 104, the inlet channel 103, the fluidic device 102, the outlet channel 105, and/or into a chamber of the pump 106.

Figure 3:
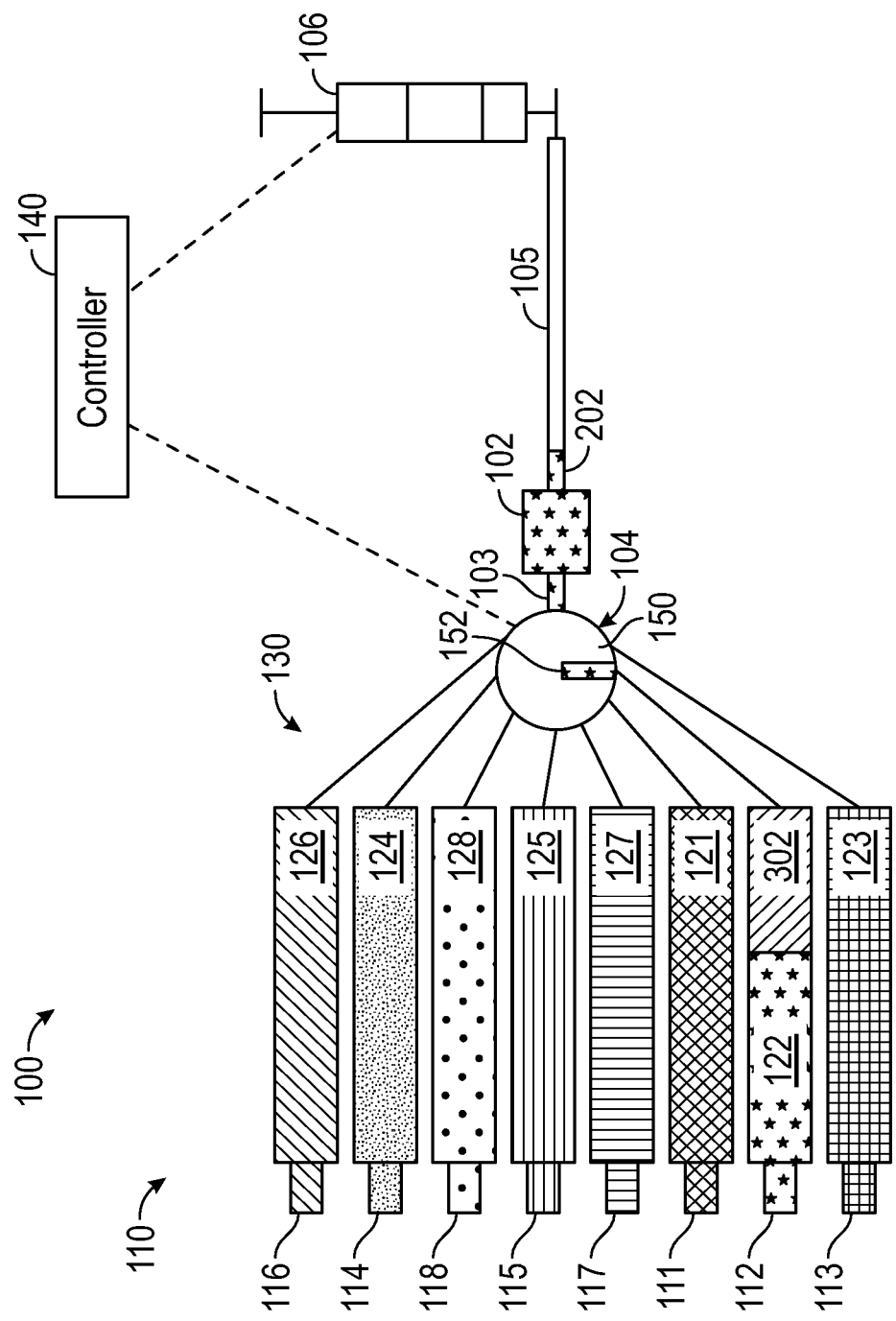
FIG. 3 is a schematic view of the system performing a first reagent reverse.

Referring to FIG. 3, the system 100 may be set to perform a first reagent reverse operation, such that the pump 106 redirects at least a portion of the aliquot 202 of the first reagent fluid 122 moved in the first reagent operation back to the first reagent fluid reservoir 112. During the first reagent reverse operation, the flow control valve 104 remains set to connect the fluidic device 102 to the first reagent fluid reservoir 112, and the pump 106 is operated to expel fluid in a reverse direction through the fluidic device 102 back into the first reagent fluid reservoir 112. As shown in FIG. 3, at least a portion 302 of the aliquot 202 of the first reagent fluid 122 moved in the first reagent operation is received back in the first reagent fluid reservoir 112 to be reused for one or more subsequent first reagent operations.

Figure 4:
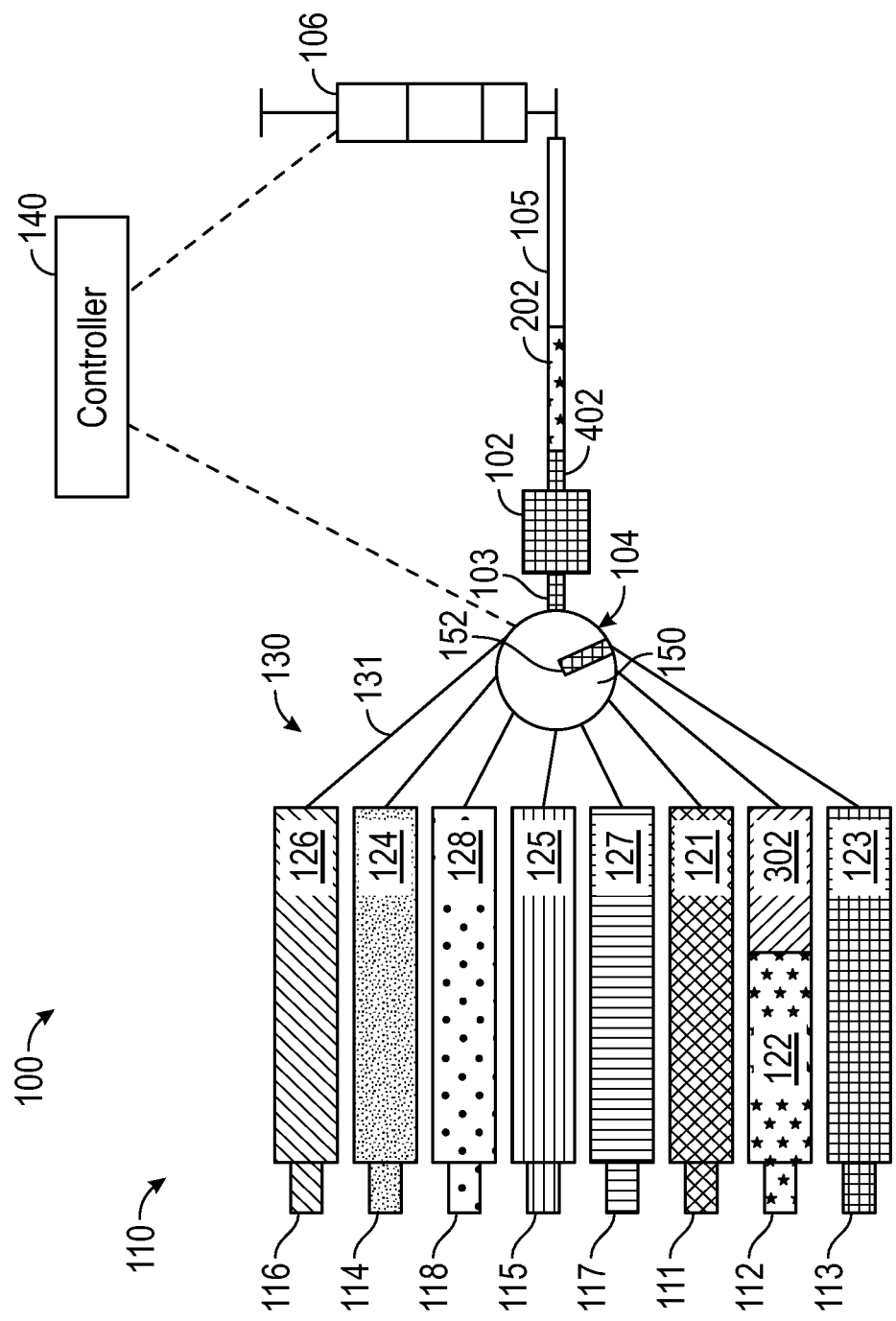
FIG. 4 is a schematic view of the system performing a first step of a first wash operation.
Figure 5:
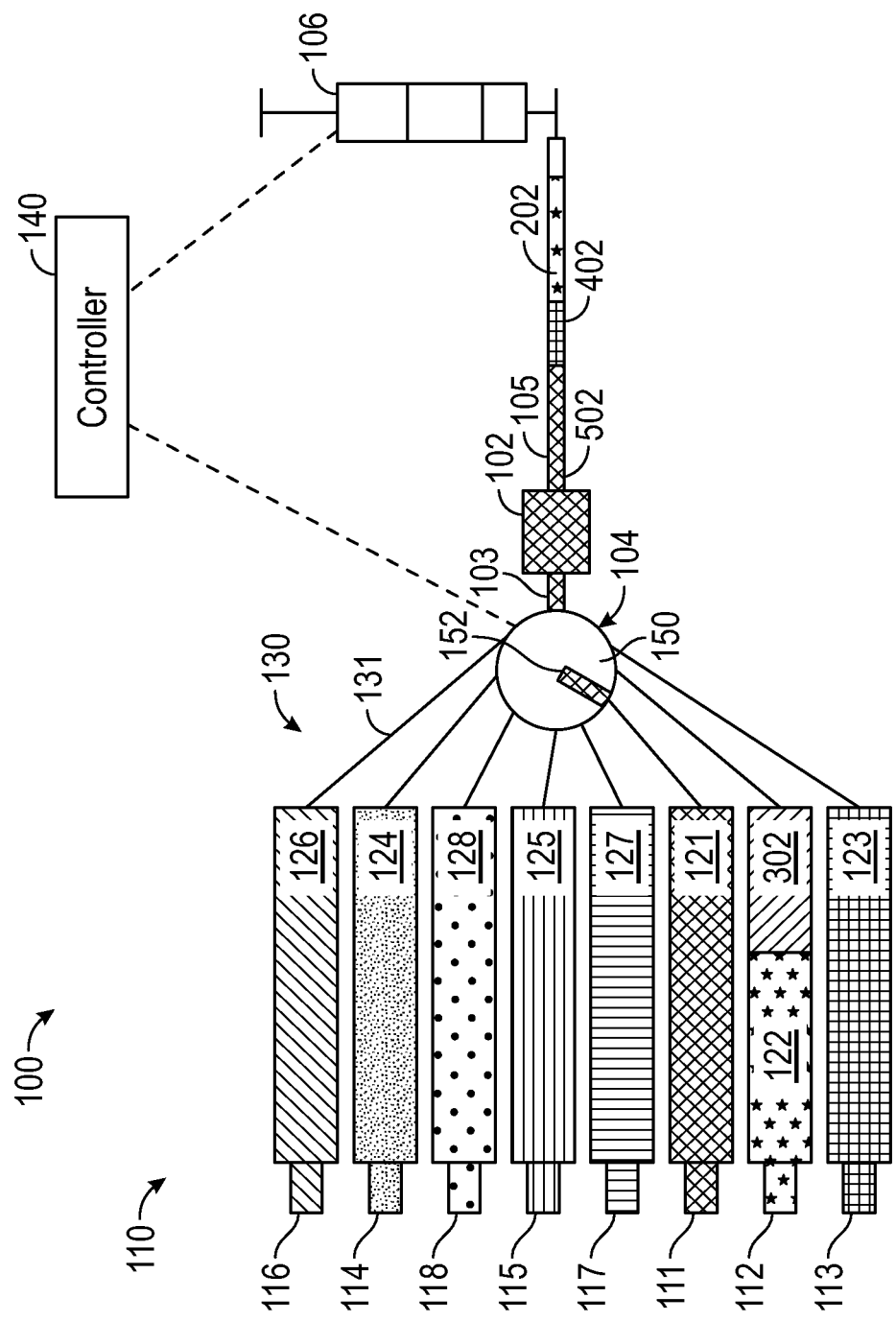
FIG. 5 is a schematic view of system performing a second step of the first wash operation.

Referring to FIGS. 4 and 5, the system 100 may be set to perform a first wash operation such that flow control valve 104 initially permits fluid flow from the selected first fluid buffer reservoir 113 of the set of reservoirs 110 to the fluidic device 102, and then, optionally, permits fluid flow from the common fluid buffer reservoir 111 of the set of reservoirs 110 to the fluidic device 102.

As shown in FIG. 4, during a first part of the first wash operation, the flow control valve 104 is set to connect the first fluid buffer reservoir 113 to the fluidic device 102 (e.g., by connecting valve selector channel 152 with the corresponding connecting channel 131 associated with the first fluid buffer reservoir 113). Pump 106 is operated to draw an aliquot of the first fluid buffer 123 from the first fluid buffer reservoir 113 through the fluidic device 102. As shown in FIG. 4, a first volume 402 of the first fluid buffer 123 is moved through the corresponding connecting channel 131, the flow control valve 104, the inlet channel 103, the fluidic device 102, the outlet channel 105, and/or into a chamber of the pump 106 to flush the first reagent fluid 122 remaining in the fluidic device 102. In some implementations, the first volume 402 may include a volume 602 of reused first fluid buffer, shown in FIG. 6, in instances where the first fluid buffer 123 has previously been pumped into the corresponding connecting channel 131, the flow control valve 104, the inlet channel 103, the fluidic device 102, the outlet channel 105, and/or a chamber of the pump 106.

As shown in FIG. 5, in some examples, during a second part of the first wash operation, after the first volume 402 of the first fluid buffer 123 is flushed through the fluidic device 102, the flow control valve 104 is set to connect the common fluid buffer reservoir 111 to the fluidic device 102 (e.g., by connecting valve selector channel 152 with the corresponding connecting channel 131 associated with the common fluid buffer reservoir 111). Pump 106 is operated to draw an aliquot of the common fluid buffer 121 from the common fluid buffer reservoir 111 through the fluidic device 102. As shown in FIG. 5, a second volume 502 of the common fluid buffer 121 can be moved through the corresponding connecting channel 131, the flow control valve 104, the inlet channel 103, the fluidic device 102, the outlet channel 105, and/or into a chamber of the pump 106. In some implementations, the second volume 502 can mix with the first volume 402 in one or more of the corresponding connecting channel 131, the flow control valve 104, the inlet channel 103, the fluidic device 102, the outlet channel 105, and/or a chamber of the pump 106. Thus, if the first volume 402 includes a volume 602 of reused first fluid buffer, shown and described in FIG. 6, the inclusion of the common fluid buffer 121 can dilute or otherwise lessen the presence of remnant first reagent fluid 122 in the reused first fluid buffer. In addition, by providing the common fluid buffer 121 after the reused first fluid buffer, the common fluid buffer 121 can fluidically separate the reused first fluid buffer further downstream from the fluidic device 102.

In other examples, the second part of the first wash operation illustrated in FIG. 5 may be omitted and only the first fluid buffer 123 for the first wash operation can be drawn from the first fluid buffer reservoir 113.

Referring to FIG. 6, the system 100 may be set to perform a first buffer reverse operation such that flow control valve 104 permits fluid flow to the first fluid buffer reservoir 113. The pump 106 redirects a third volume 602 of used fluid buffer comprising the first fluid buffer 123 and/or the common fluid buffer 121 back to the first fluid buffer reservoir 113. The third volume 602 can include at least a portion of remnant first reagent fluid 122 in addition to the first fluid buffer 123 and/or the common fluid buffer 121. In some instances, the percentage of the common fluid buffer 121 in the third volume 602 is greater than a percentage of first fluid buffer 123 and/or reused first fluid buffer. During the first buffer reverse operation, the flow control valve 104 is set to connect the fluidic device 102 to the first fluid buffer reservoir 113 (e.g., by connecting valve selector channel 152 with the connecting channel 131 associated with the first fluid buffer reservoir 113), and the pump 106 is operated to move fluid in a reverse direction through the fluidic device 102 to the first fluid buffer reservoir 113. As shown in FIG. 6, the third volume 602 of used fluid buffer is received back in the first fluid buffer reservoir 113 to be reused for one or more subsequent first wash operations. In some examples, the third volume 602 of used fluid buffer is less than or equal to the second volume 502 moved from the common fluid buffer reservoir 111, in other examples, the third volume 602 of used fluid buffer is greater than the second volume 502 moved from the common fluid buffer reservoir 111, and, in other examples, the third volume 602 of used fluid buffer is equal to the total amount of fluid buffer flushed through the fluidic device 102, i.e., the combined first fluid volume 402 moved from the first fluid buffer reservoir 113 and second volume 502 moved from the common fluid buffer reservoir 111.

Figure 7:
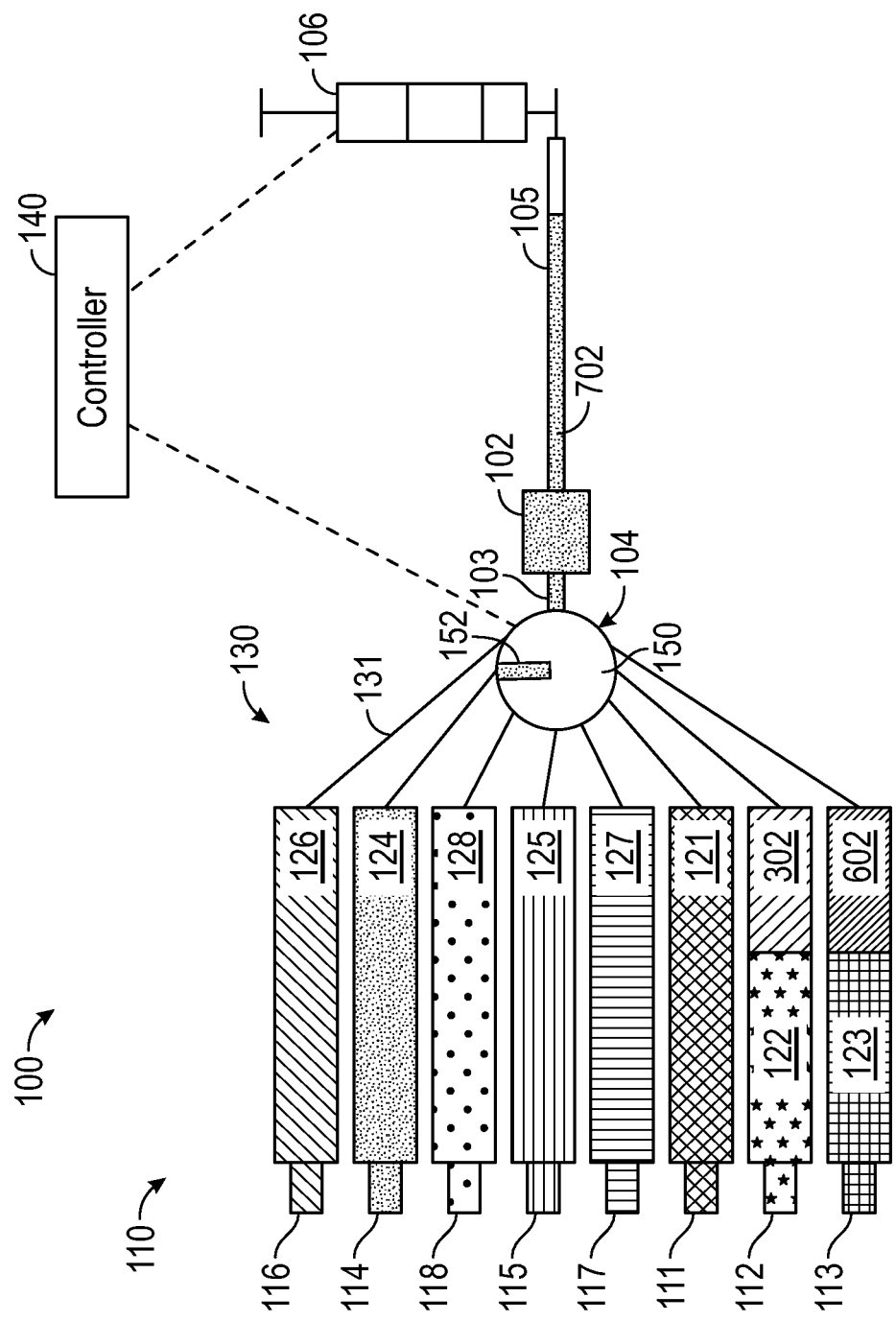
FIG. 7 is a schematic view of the system performing a second reagent operation.

Referring to FIG. 7, the system 100 may be set to perform a second reagent operation, such that flow control valve 104 permits fluid flow from the selected second reagent fluid reservoir 114 of the set of reservoirs 110 to the fluidic device 102. During the second reagent operation, the flow control valve 104 is set to connect the second reagent fluid reservoir 114 to the fluidic device 102 (e.g., by connecting valve selector channel 152 with the corresponding connecting channel 131 associated with the second reagent fluid reservoir 114). The pump 106 is operated to draw the second reagent fluid 124 from the second reagent fluid reservoir 114 through the flow control valve 104 and into the fluidic device 102. As shown in FIG. 7, an aliquot 702 of the second reagent fluid 124 is moved through the corresponding connecting channel 131, the flow control valve 104, the inlet channel 103, the fluidic device 102, the outlet channel 105, and/or into a chamber of the pump 106.

Figure 8:
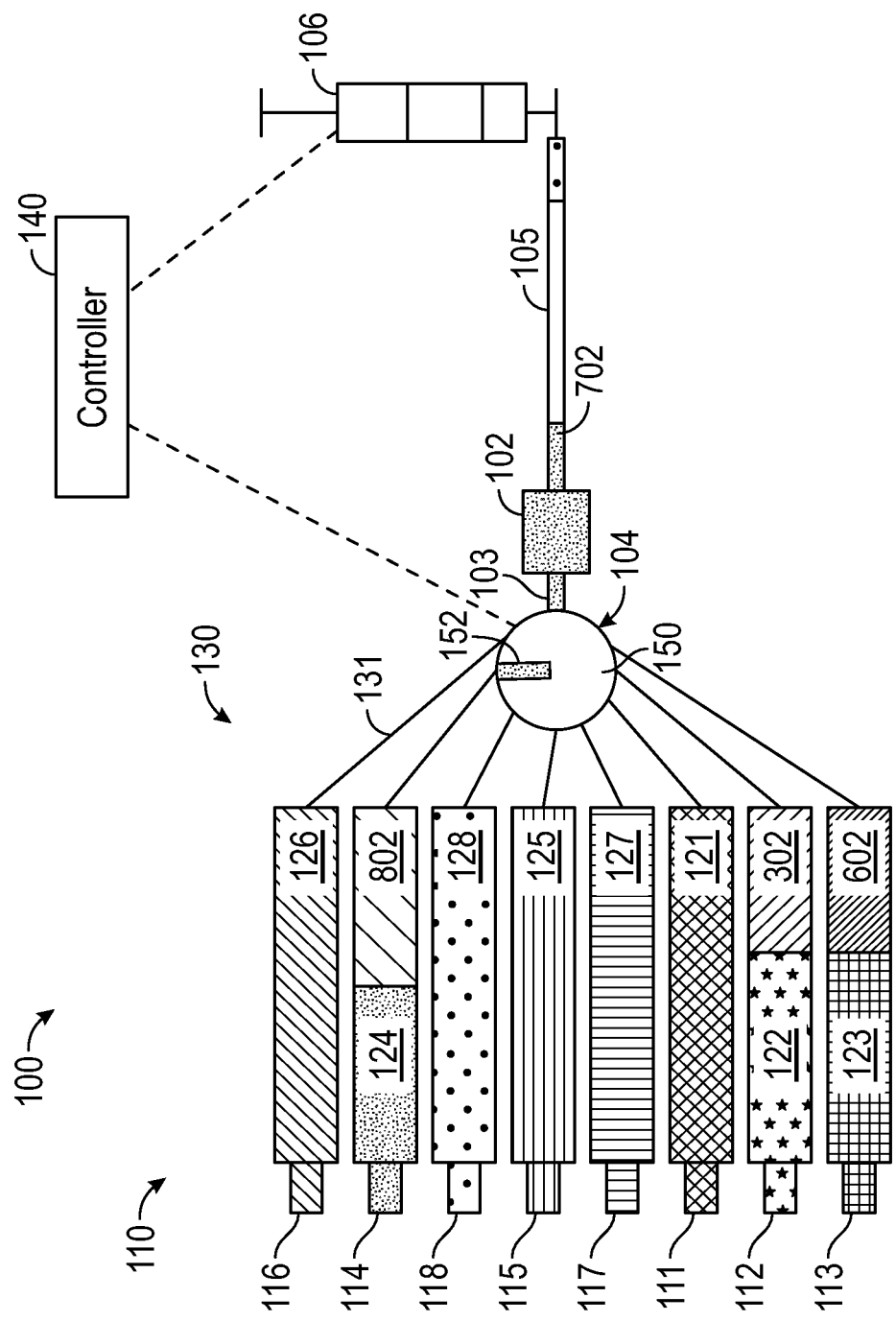
FIG. 8 is a schematic view of the system performing a second reagent reverse.

Referring to FIG. 8, the system 100 may be set to perform a second reagent reverse operation, such that the pump 106 redirects at least a portion of the aliquot 702 of the second reagent fluid 124 moved in the second reagent operation back to the second reagent fluid reservoir 114. During the second reagent reverse operation, the flow control valve 104 remains set to connect the fluidic device 102 to the second reagent fluid reservoir 114, and the pump 106 is operated to expel fluid in a reverse direction through the fluidic device 102 back into the second reagent fluid reservoir 114. As shown in FIG. 8, at least a portion 802 of the aliquot 702 of the second reagent fluid 124 moved in the second reagent operation is received back in the second reagent fluid reservoir 114 to be reused in one or more subsequent second reagent operations.

Figure 9:
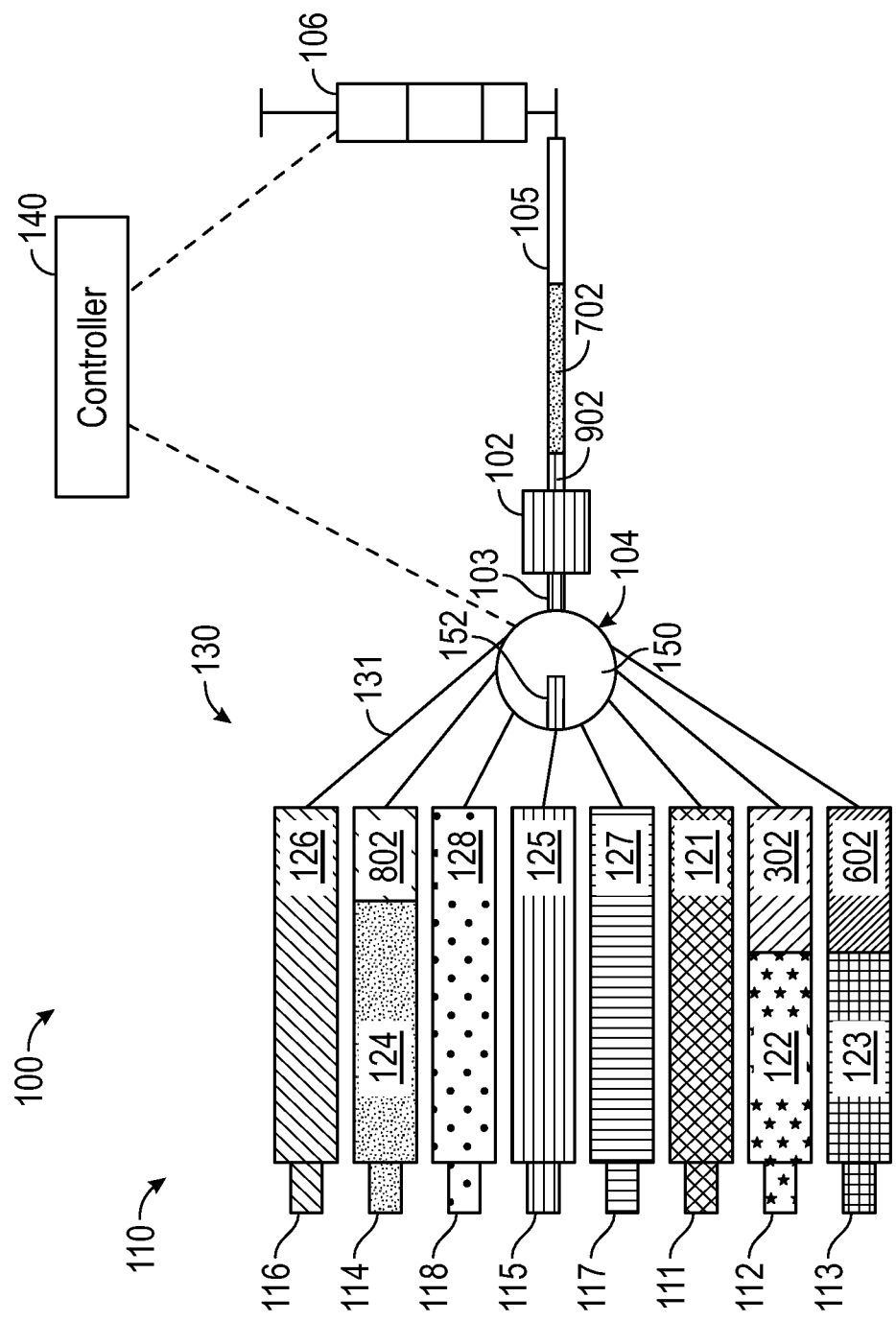
FIG. 9 is a schematic view of the system performing a first step of a second wash operation.
Figure 10:
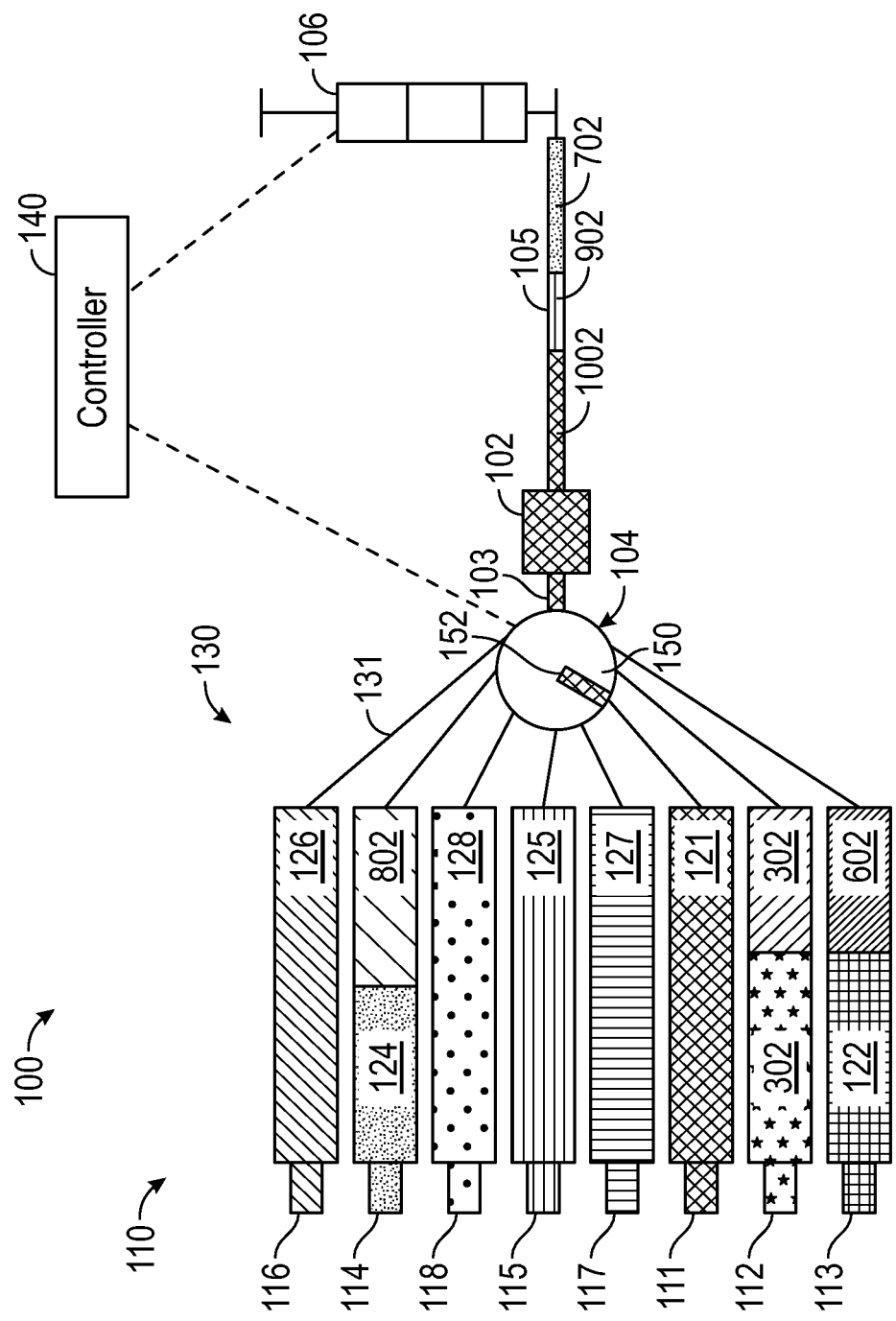
FIG. 10 is a schematic view of the system performing a second step of the second wash operation.

Referring to FIGS. 9 and 10, the system 100 may be set to perform a second wash operation such that flow control valve 104 initially permits fluid flow from the selected second fluid buffer reservoir 115 of the set of reservoirs 110 to the fluidic device 102, and then, optionally, permits fluid flow from the common fluid buffer reservoir 111 of the set of reservoirs 110 to the fluidic device 102.

As shown in FIG. 9, during a first part of the second wash operation, the flow control valve 104 is set to connect the second fluid buffer reservoir 115 to the fluidic device 102 (e.g., by connecting valve selector channel 152 with the corresponding connecting channel 131 associated with the second buffer reservoir 115). Pump 106 is operated to draw an aliquot of the second fluid buffer 125 from the second fluid buffer reservoir 115 through the fluidic device 102. As shown in FIG. 9, a fourth volume 902 of the second fluid buffer 125 is moved through the corresponding connecting channel 131, the flow control valve 104, the inlet channel 103, the fluidic device 102, the outlet channel 105, and/or into a chamber of the pump 106 to flush the second reagent fluid 124 remaining in the fluidic device 102. In some implementations, the fourth volume 902 may include a volume 1102 of reused second fluid buffer, shown in FIG. 11, in instances where the second fluid buffer 125 has previously been pumped into the corresponding connecting channel 131, the flow control valve 104, the inlet channel 103, the fluidic device 102, the outlet channel 105, and/or a chamber of the pump 106.

As shown in FIG. 10, in some examples, during a second part of the second wash operation, after the fourth volume 902 of the second fluid buffer 125 is flushed through the fluidic device 102, the flow control valve 104 is set to connect the common fluid buffer reservoir 111 to the fluidic device 102 (e.g., by connecting valve selector channel 152 with the corresponding connecting channel 131 associated with the common fluid buffer reservoir 111). Pump 106 is operated to draw an aliquot of the common fluid buffer 121 from the common fluid buffer reservoir 111 through the fluidic device 102. As shown in FIG. 10, a fifth volume 1002 of the common fluid buffer 121 can be moved through the corresponding connecting channel 131, the flow control valve 104, the inlet channel 103, the fluidic device 102, the outlet channel 105, and/or into a chamber of the pump 106. In some implementations, the fifth volume 1002 can mix with the fourth volume 902 in one or more of the corresponding connecting channel 131, the flow control valve 104, the inlet channel 103, the fluidic device 102, the outlet channel 105, and/or a chamber of the pump 106. Thus, if the fourth volume 902 includes a volume 1102 of reused second fluid buffer, shown and described in FIG. 11, the inclusion of the common fluid buffer 121 can dilute or otherwise lessen the presence of remnant second reagent fluid 124 in the reused second fluid buffer. In addition, by providing the common fluid buffer 121 after the reused second fluid buffer, the common fluid buffer 121 can fluidically separate the reused second fluid buffer further downstream from the fluidic device 102.

In other examples, the second part of the second wash operation illustrated in FIG. 10 may be omitted and only the second fluid buffer 125 for second wash operation can be drawn from the second fluid buffer reservoir 115.

Figure 11:
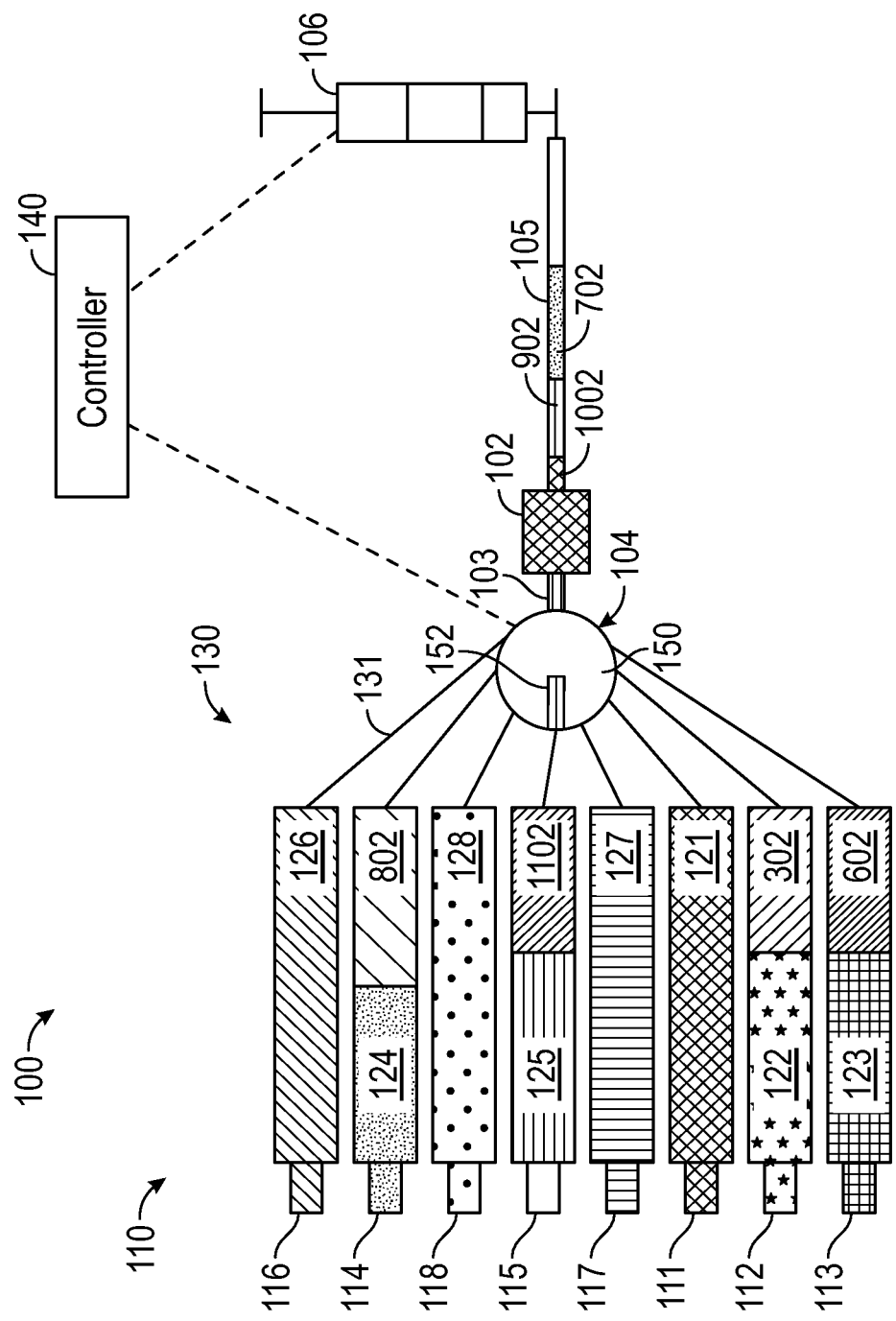
FIG. 11 is a schematic view of the system performing a second buffer reverse.

Referring to FIG. 11, the system 100 may be set to perform a second buffer reverse operation such that flow control valve 104 permits fluid flow to the second fluid buffer reservoir 115. The pump 106 redirects a sixth volume 1102 of used fluid buffer comprising the second fluid buffer 125 and/or the common fluid buffer 121 back to the second fluid buffer reservoir 115. The sixth volume 1102 can include at least a portion of remnant second reagent fluid 124 in addition to the second fluid buffer 125 and/or the common fluid buffer 121. In some instances, the percentage of the common fluid buffer 121 in the sixth volume 1102 is greater than a percentage of second fluid buffer 125 and/or reused second fluid buffer. During the second buffer reverse operation, the flow control valve 104 is set to connect the fluidic device 102 to the second fluid buffer reservoir 115 (e.g., by connecting valve selector channel 152 with the connecting channel 131 associated with the second fluid buffer reservoir 115), and the pump 106 is operated to move fluid in a reverse direction through the fluidic device 102 to the second fluid buffer reservoir 115. As shown in FIG. 11, the sixth volume 1102 of used fluid buffer is received back in the second fluid buffer reservoir 115 to be reused for one or more subsequent second wash operations. In some examples, the sixth volume 1102 of used fluid buffer is less than or equal to the fifth volume 1002 moved from the common fluid buffer reservoir 111, in other examples, the sixth volume 1102 of used fluid buffer is greater than the fifth volume 1002 moved from the common fluid buffer reservoir 111, and, in other examples, the sixth volume 1102 of used fluid buffer is equal to the total amount of fluid buffer flushed through the fluidic device 102, i.e., the combined fourth volume 902 moved from the second fluid buffer reservoir 115 and fifth volume 1002 moved from the common fluid buffer reservoir 111.

Figure 12:
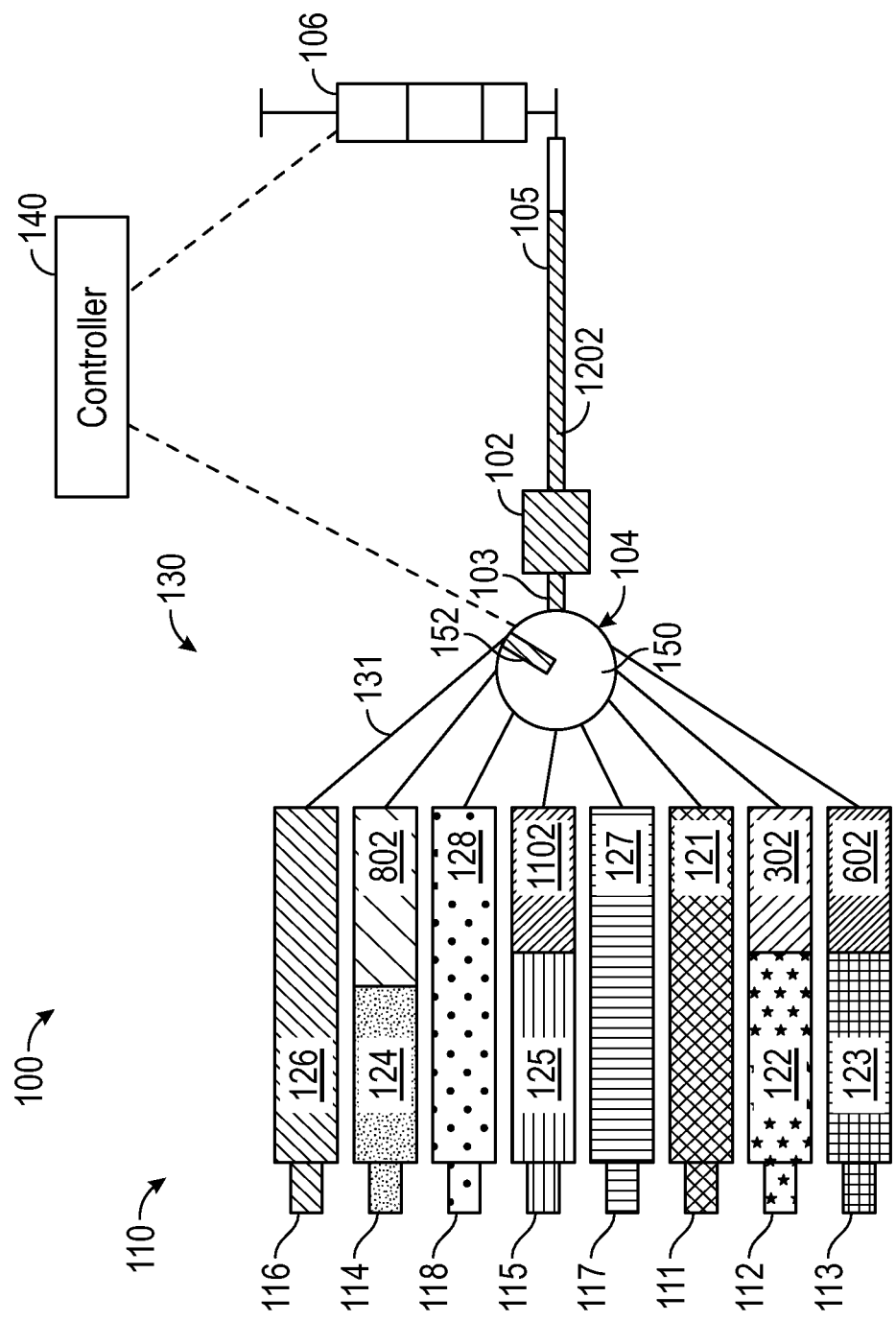
FIG. 12 is a schematic view of the system performing a third reagent operation.

Referring to FIG. 12, the system 100 may be set to perform a third reagent operation, such that flow control valve 104 permits fluid flow from the selected third reagent fluid reservoir 116 of the set of reservoirs 110 to the fluidic device 102. During the third reagent operation, the flow control valve 104 is set to connect the third reagent fluid reservoir 116 to the fluidic device 102 (e.g., by connecting valve selector channel 152 with the corresponding connecting channel 131 associated with the third reagent fluid reservoir 116). The pump 106 is operated to draw the third reagent fluid 126 from the third reagent fluid reservoir 116 through the flow control valve 104 and into the fluidic device 102. As shown in FIG. 12, an aliquot 1202 of the third reagent fluid 126 is moved through the corresponding connecting channel 131, the flow control valve 104, the inlet channel 103, the fluidic device 102, the outlet channel 105, and/or into a chamber of the pump 106.

Figure 13:
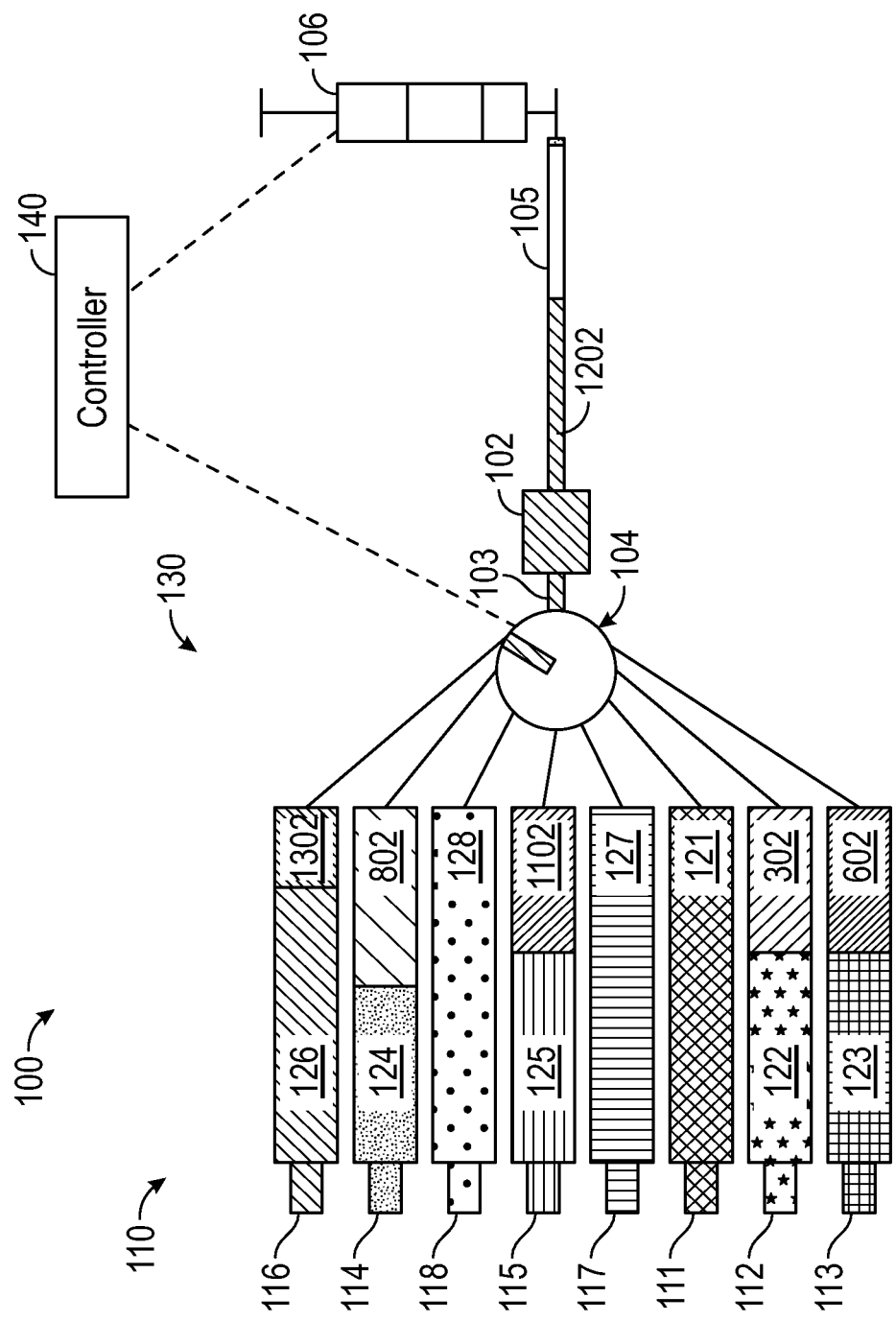
FIG. 13 is a schematic view of the system performing a third reagent reverse.

Referring to FIG. 13, the system 100 may be set to perform a third reagent reverse operation, such that the pump 106 redirects at least a portion of the aliquot 1202 of the third reagent fluid 126 moved in the third reagent operation back into the third reagent fluid reservoir 116. During the third reagent reverse operation, the flow control valve 104 remains set to connect the fluidic device 102 to the third reagent fluid reservoir 116, and the pump 106 is operated to expel fluid in a reverse direction through the fluidic device 102 to the third reagent fluid reservoir 116. As shown in FIG. 13, at least a portion 1302 of the aliquot 1202 of the third reagent fluid 126 moved in the third reagent operation is received back in the third reagent fluid reservoir 116 to be reused for one or more subsequent third reagent operations.

Figure 14:
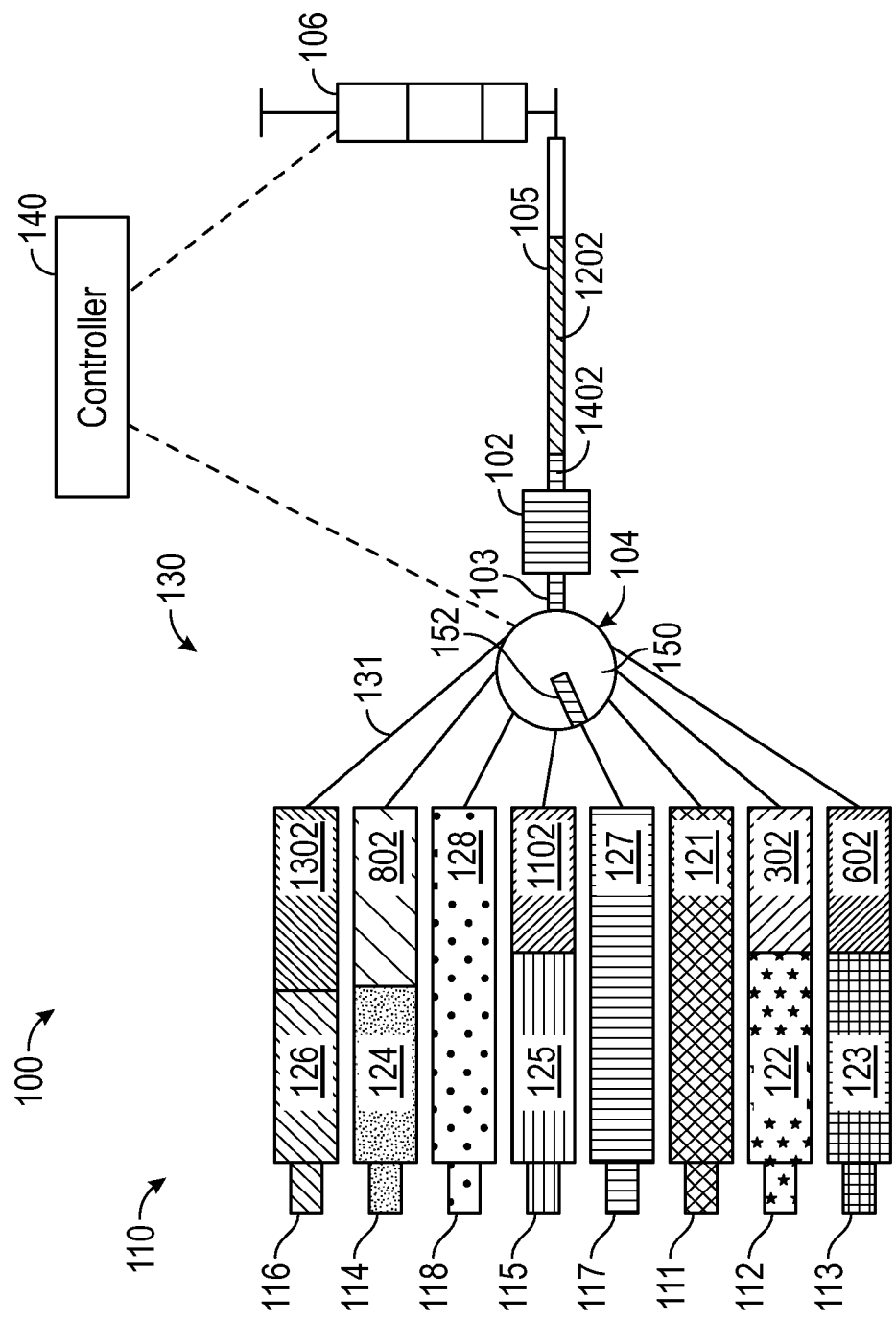
FIG. 14 is a schematic view of the system performing a first step of a third wash operation.
Figure 15:
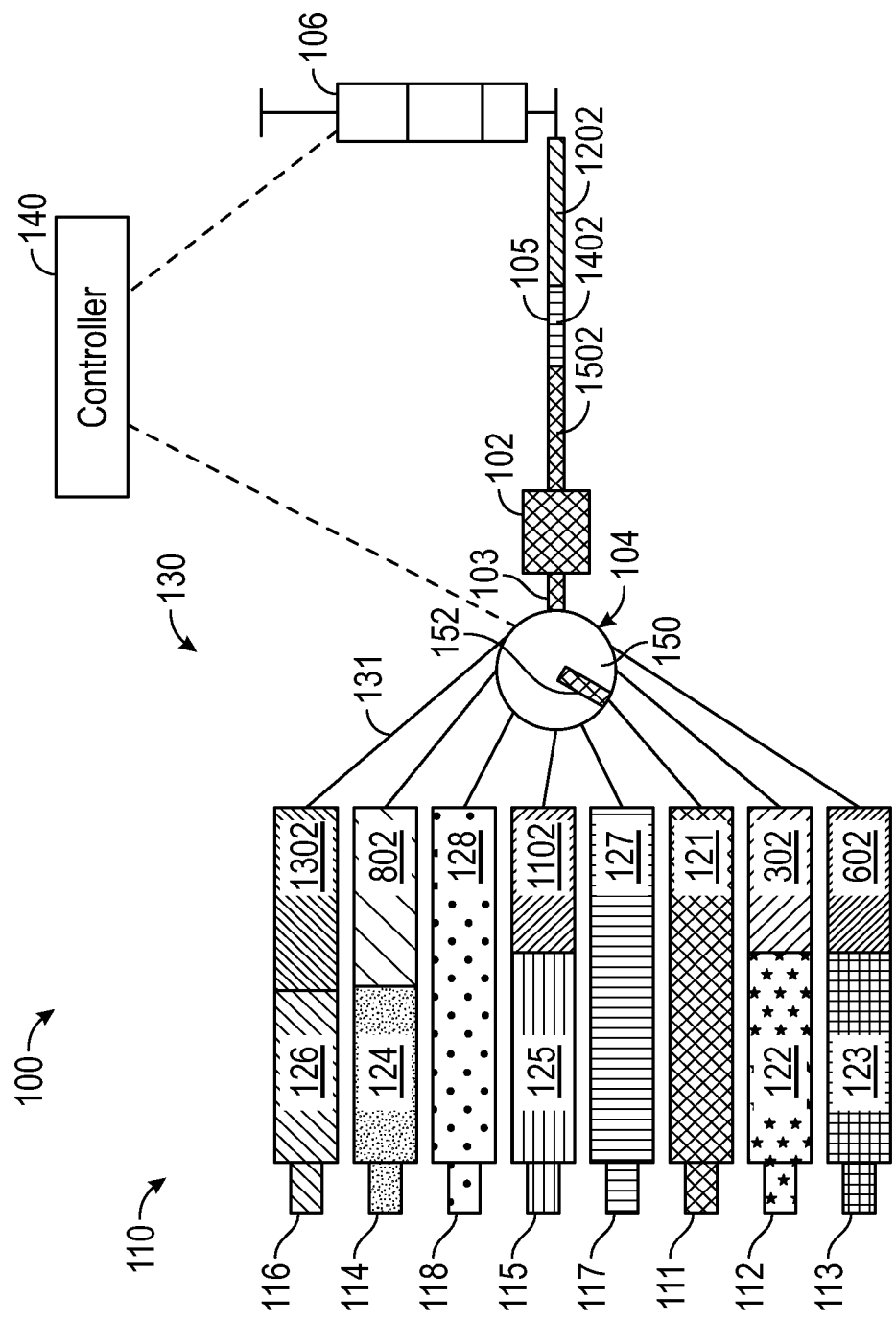
FIG. 15 is a schematic view of the system performing a second step of the third wash operation.

Referring to FIGS. 14 and 15, the system 100 may be set to perform a third wash operation, such that flow control valve 104 initially permits fluid flow from the selected third fluid buffer reservoir 117 of the set of reservoirs 110 to the fluidic device 102, and then, optionally, permits fluid flow from the common fluid buffer reservoir 111 of the set of reservoirs 110 to the fluidic device 102.

As shown in FIG. 14, during a first part of the third wash operation, the flow control valve 104 is set to connect the third fluid buffer reservoir 117 to the fluidic device 102 (e.g., by connecting valve selector channel 152 with the corresponding connecting channel 131 associated with the third buffer reservoir 117). Pump 106 is operated to draw an aliquot of the third fluid buffer 127 from the third fluid buffer reservoir 117 through the fluidic device 102. As shown in FIG. 14, a seventh volume 1402 of the third fluid buffer 127 is moved through the corresponding connecting channel 131, the flow control valve 104, the inlet channel 103, the fluidic device 102, the outlet channel 105, and/or into a chamber of the pump 106 to flush the third reagent fluid 126 remaining in the fluidic device 102. In some implementations, the seventh volume 1402 may include a volume 1602 of reused third fluid buffer, shown in FIG. 16, in instances where the third fluid buffer 127 has previously been pumped into the corresponding connecting channel 131, the flow control valve 104, the inlet channel 103, the fluidic device 102, the outlet channel 105, and/or a chamber of the pump 106.

As shown in FIG. 15, in some examples, during a second part of the third wash operation, after the seventh volume 1402 of the third fluid buffer 127 is flushed through the fluidic device 102, the flow control valve 104 is set to connect the common fluid buffer reservoir 111 to the fluidic device 102 (e.g., by connecting valve selector channel 152 with the corresponding connecting channel 131 associated with the common fluid buffer reservoir 111). Pump 106 is operated to draw an aliquot of the common fluid buffer 121 from the common fluid buffer reservoir 111 through the fluidic device 102. As shown in FIG. 15, an eighth volume 1502 of the common fluid buffer 121 can be moved through the corresponding connecting channel 131, the flow control valve 104, the inlet channel 103, the fluidic device 102, the outlet channel 105, and/or into a chamber of the pump 106. In some implementations, the eighth volume 1502 can mix with the seventh volume 1402 in one or more of the corresponding connecting channel 131, the flow control valve 104, the inlet channel 103, the fluidic device 102, the outlet channel 105, and/or a chamber of the pump 106. Thus, if the seventh volume 1402 includes a volume 1602 of reused third fluid buffer, shown and described in FIG. 16, the inclusion of the common fluid buffer 121 can dilute or otherwise lessen the presence of remnant third reagent fluid 126 in the reused third fluid buffer. In addition, by providing the common fluid buffer 121 after the reused third fluid buffer, the common fluid buffer 121 can fluidically separate the reused third fluid buffer further downstream from the fluidic device 102.

In other examples, the second part of the second wash operation illustrated in FIG. 15 may be omitted and only the third fluid buffer 127 for third wash operation can be drawn from the third fluid buffer reservoir 117.

Figure 16:
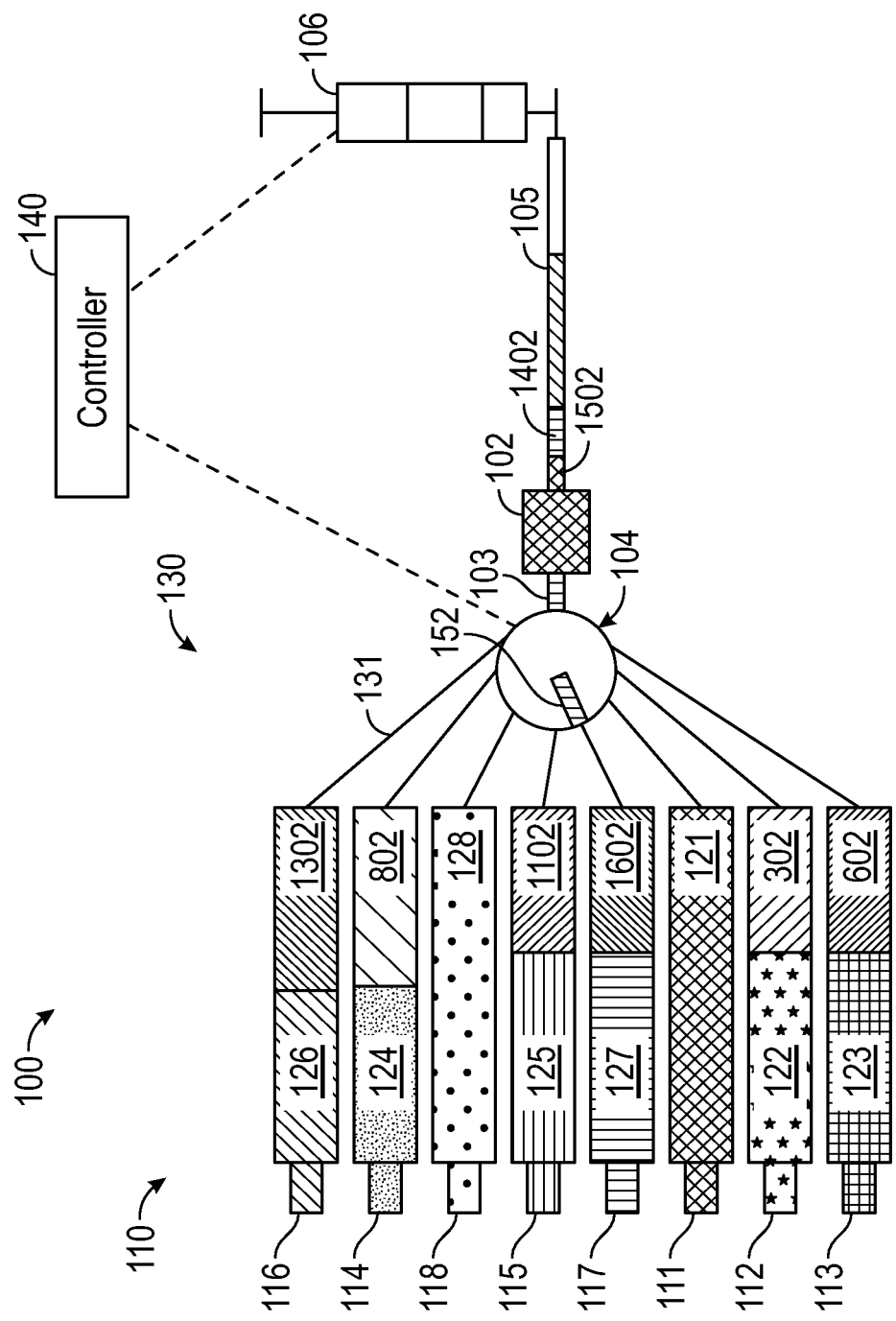
FIG. 16 is a schematic view of the system performing a third buffer reverse.

Referring to FIG. 16, the system 100 may be set to perform a third buffer reverse operation such that flow control valve 104 permits fluid flow to the third fluid buffer reservoir 117. The pump 106 redirects a ninth volume 1602 of used fluid buffer comprising the third fluid buffer 127 and/or the common fluid buffer 121 back to the third fluid buffer reservoir 117. The ninth volume 1602 can include at least a portion of remnant third reagent fluid 126 in addition to the third fluid buffer 127 and/or the common fluid buffer 121. In some instances, the percentage of the common fluid buffer 121 in the ninth volume 1602 is greater than a percentage of third fluid buffer 127 and/or reused third fluid buffer. During the third buffer reverse operation, the flow control valve 104 is set to connect the fluidic device 102 to the third fluid buffer reservoir 117 (e.g., by connecting valve selector channel 152 with the connecting channel 131 associated with the third fluid buffer reservoir 117), and the pump 106 is operated to move fluid in a reverse direction through the fluidic device 102 to the third fluid buffer reservoir 117. As shown in FIG. 16, the ninth volume 1602 of used fluid buffer is received back in the third fluid buffer reservoir 117 to be reused for one or more subsequent third wash operations. In some examples, the ninth volume 1602 of used fluid buffer is less than or equal to the eighth volume 1502 moved from the common fluid buffer reservoir 111, in other examples, the ninth volume 1602 of used fluid buffer is greater than the eighth volume 1502 moved from the common fluid buffer reservoir 111, and, in other examples, the ninth volume 1602 of used fluid buffer is equal to the total amount of fluid buffer flushed through the fluidic device 102, i.e., the combined seventh volume 1402 moved from the third fluid buffer reservoir 117 and eighth volume 1502 moved from the common fluid buffer reservoir 111.

Figure 17:
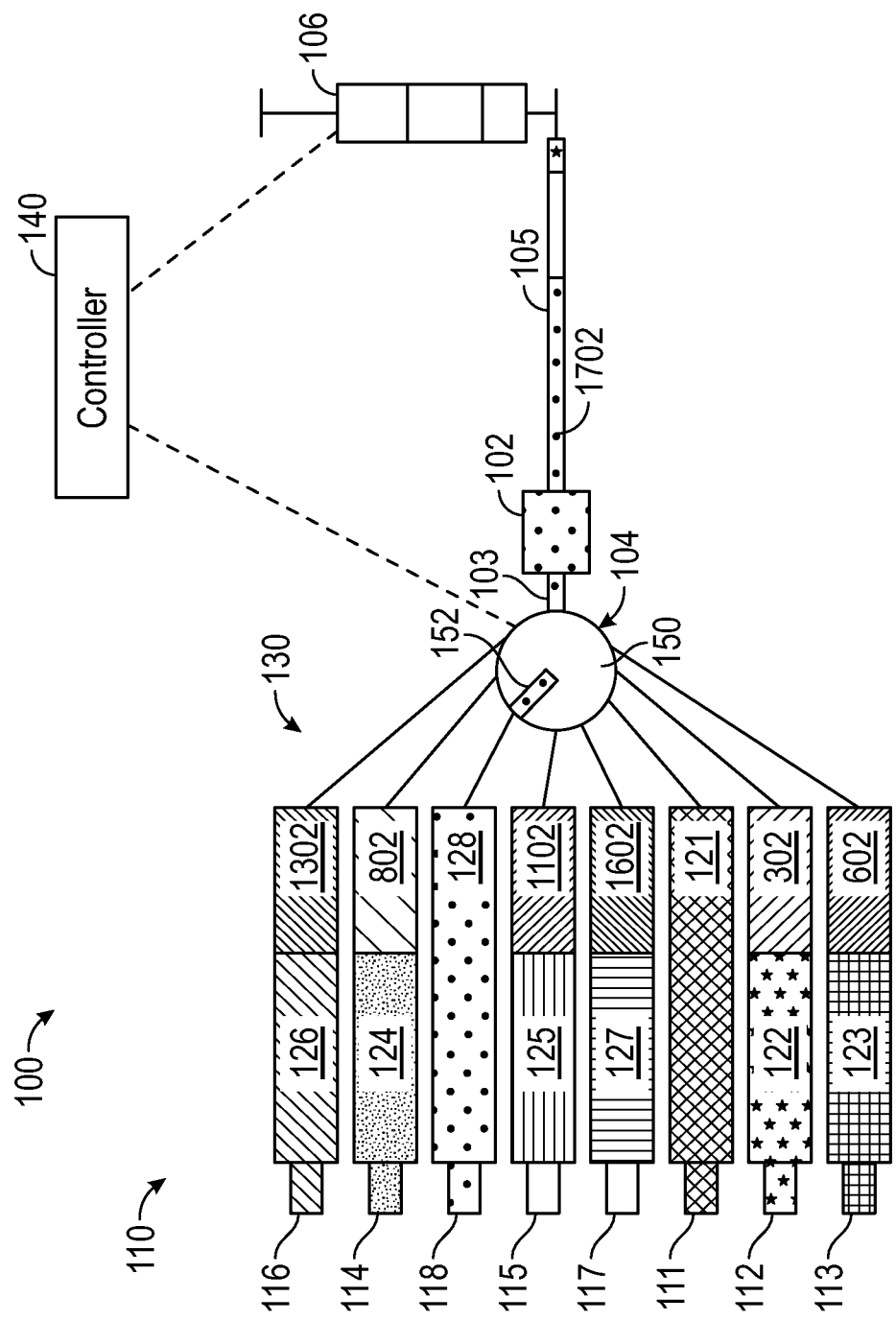
FIG. 17 is a schematic view of the system performing a fourth reagent operation.

Referring to FIG. 17, the system 100 may be set to perform a fourth reagent operation, such that flow control valve 104 permits fluid flow from the selected fourth reagent fluid reservoir 118 of the set of reservoirs 110 to the fluidic device 102. During the fourth reagent operation, the flow control valve 104 is set to connect the fourth reagent fluid reservoir 118 to the fluidic device 102 (e.g., by connecting valve selector channel 152 with the corresponding connecting channel 131 associated with the fourth reagent fluid reservoir 118). The pump 106 is operated to draw the fourth reagent fluid 128 from the fourth reagent fluid reservoir 118 through the flow control valve 104 and into the fluidic device 102. As shown in FIG. 17, an aliquot 1702 of the fourth reagent fluid 128 is moved through the corresponding connecting channel 131, the flow control valve 104, the inlet channel 103, the fluidic device 102, the outlet channel 105, and/or into a chamber of the pump 106.

Figure 18:
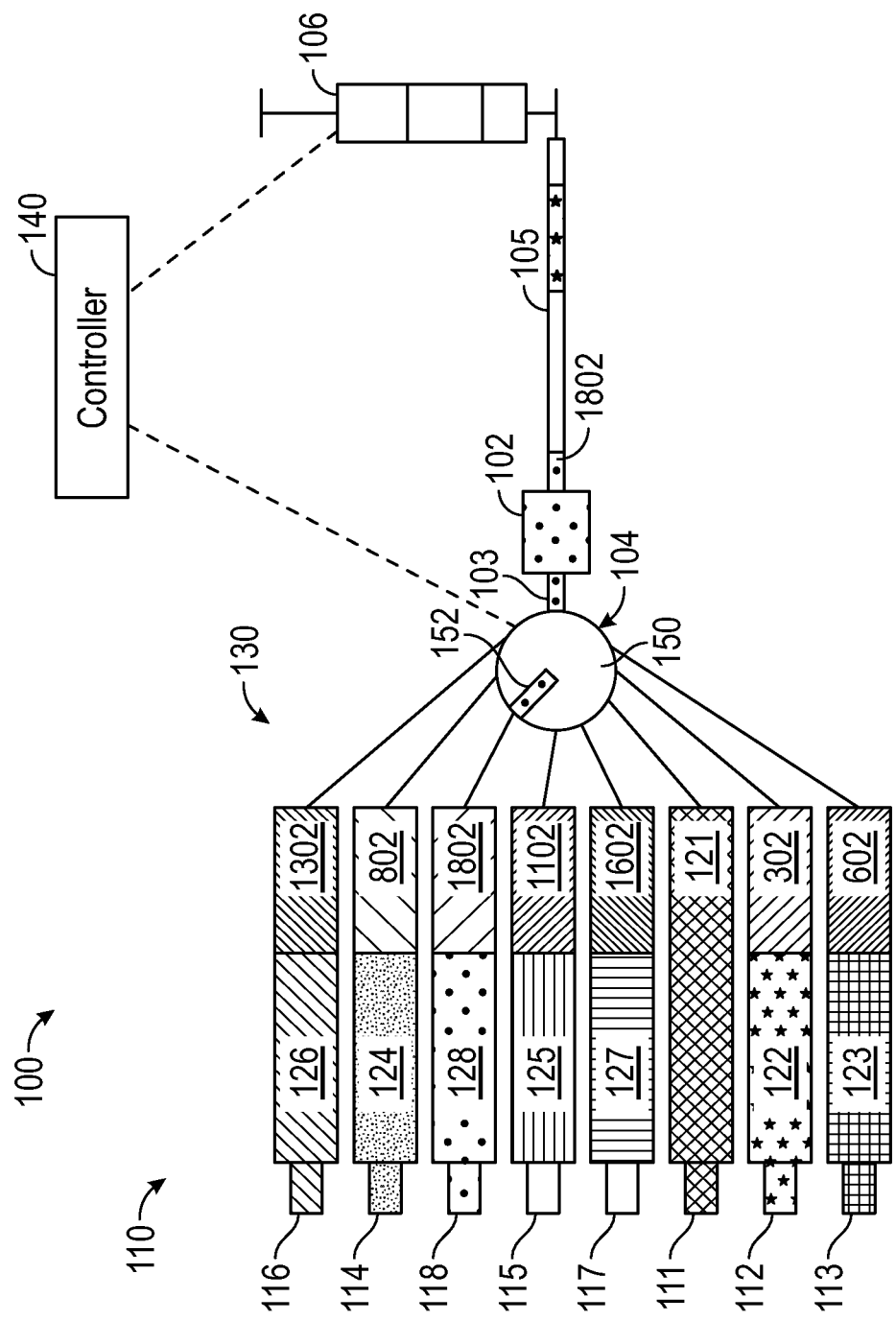
FIG. 18 is a schematic view of the system performing a fourth reagent reverse.

Referring to FIG. 18, the system 100 may be set to perform a fourth reagent reverse operation, such that the pump 106 redirects at least a portion of the aliquot 1702 of the fourth reagent fluid 128 moved in the fourth reagent operation back into the fourth reagent fluid reservoir 118. During the fourth reagent reverse operation, the flow control valve 104 remains set to connect the fluidic device 102 to the fourth reagent fluid reservoir 118, and the pump 106 is operated to expel fluid in a reverse direction through the fluidic device 102 to the fourth reagent fluid reservoir 118. As shown in FIG. 18, at least a portion 1802 of the aliquot 1702 of the fourth reagent fluid 128 moved in the fourth reagent operation is received back in the fourth reagent fluid reservoir 118 to be reused for subsequent fourth reagent operation.

In some examples, it may not be feasible or practical to reuse a fluid buffer after a wash operation—for example, if the characteristics of reagent or other material being flushed in the wash operation are such that the risk of carryover from re-using a buffer used to flush the reagent are too great. In one example, combining fluid buffer used to flush reagents in the fluidic device 102 after a scavenger process of the SBS operation with fresh buffer typically compromises the subsequent processes of the SBS operation, even if a trace amount of the used fluid buffer was added to the fresh buffer. In such a situation, buffer may be moved through the fluidic device, for example, from the common buffer reservoir 111, but the used buffer is not thereafter reversed back to a sequestered fluid buffer reservoir. In some examples, the risk of reusing a fluid buffer is determined to be too great when the used fluid buffer exceeds a first contamination level, which may be determined by experimentation.

In some examples, the system 100 may reuse fluid buffer from the same designated reservoir in two different wash operations that follow two different reagent operations. For example, if the characteristics of the reagent or other material of a first reagent operation are benign, meaning that the presence of the reagent or the material would not affect or compromise another reagent operation (e.g., a second reagent operation), then the fluid buffer used to flush that reagent or material after the first reagent operation may be used again in the wash operation following the second reagent operation. In some examples, a used fluid buffer is determined be benign when the used fluid buffer is below a second contamination level, which may be determined by experimentation.

Figure 19:
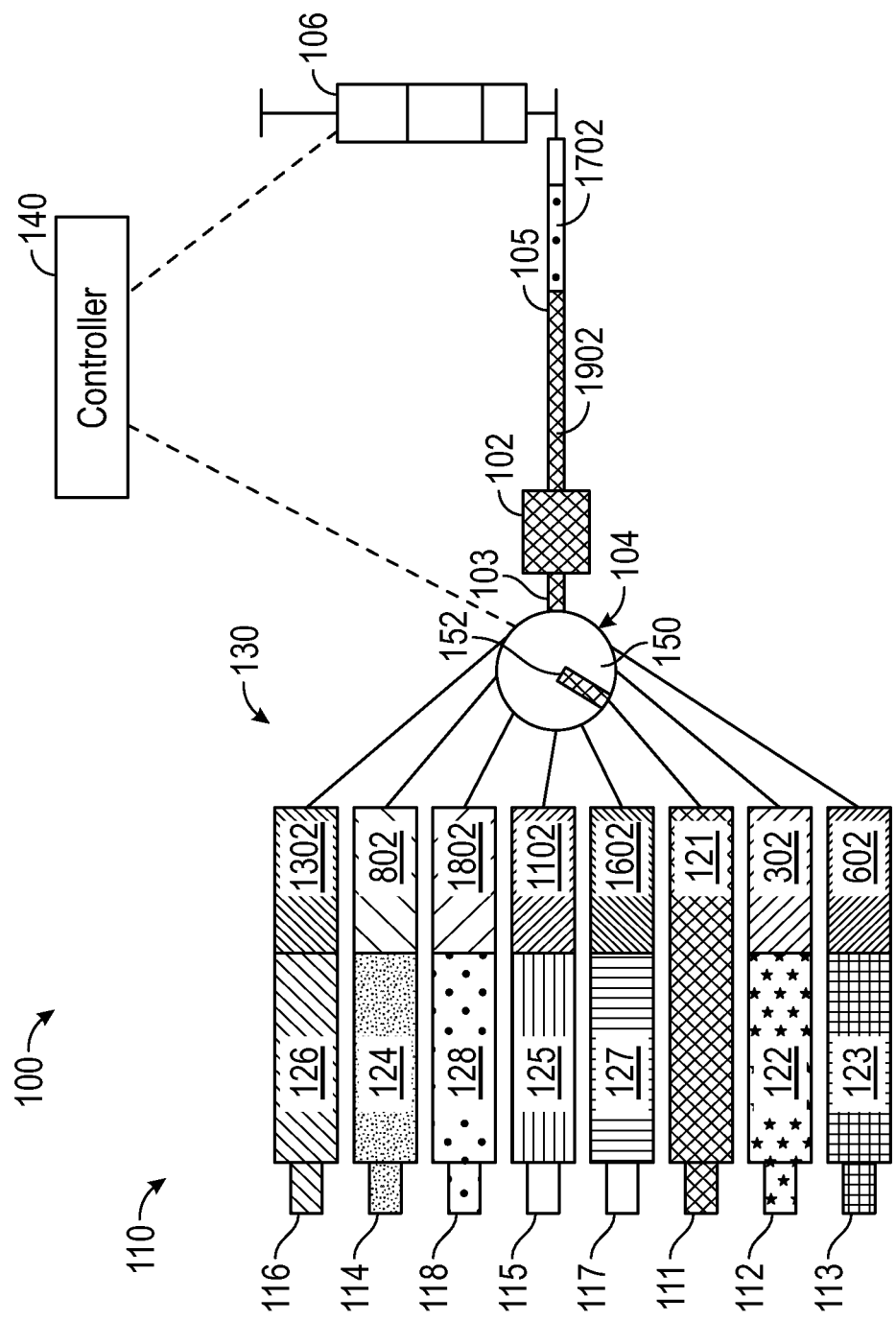
FIG. 19 is a schematic view of the system performing a fourth wash operation.

Referring to FIG. 19, the system 100 may be set to perform a fourth wash operation, such that flow control valve 104 permits fluid flow from the selected common fluid buffer reservoir 111 of the set of reservoirs 110 to the fluidic device 102. As shown in FIG. 19, a volume 1902 of the common fluid buffer 121 is moved through the corresponding connecting channel 131, the flow control valve 104, the inlet channel 103, the fluidic device 102, the outlet channel 105, and/or into a chamber of the pump 106 to flush the fourth reagent fluid 128 remaining in the fluidic device 102. The system 100, however, does not include a fluid buffer reservoir for storing and sequestering the buffer used in the fourth wash operation for possible re-use. Thus, the volume 1902 of buffer moved through the fluidic device during the fourth wash operation is not reversed from the corresponding connecting channel 131, the flow control valve 104, the inlet channel 103, the fluidic device 102, the outlet channel 105, and/or a chamber of the pump 106. Rather, the fluid buffer may be flushed through the corresponding connecting channel 131, the flow control valve 104, the inlet channel 103, the fluidic device 102, the outlet channel 105, and/or a chamber of the pump 106 and moved into a waste reservoir (not shown).

Method for Sequestering and Reusing Reagent Fluid and Fluid Buffer

Figure 20:
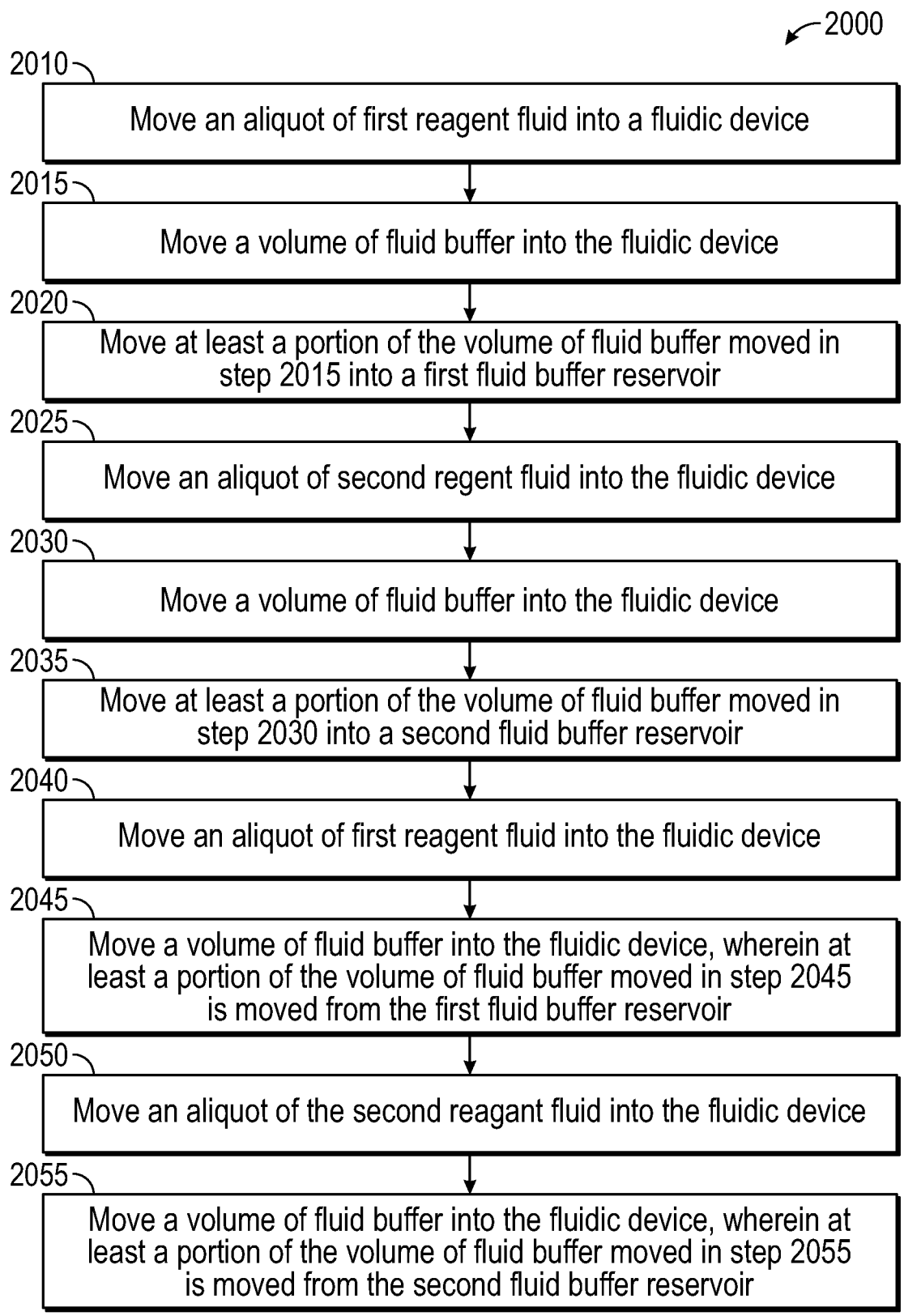
FIG. 20 is a flow chart of an exemplary method for sequestering and reusing two or more reagent fluids and fluid buffers through a fluidic device.

According to various examples, FIG. 20 illustrates a method 2000 for sequestering and reusing reagent fluids and fluid buffers.

Method 2000 comprises a step 2010 of moving an aliquot of first reagent fluid 122 into the fluidic device 102. In some examples, step 2010 comprises setting the flow control valve 104 to permit fluid flow from the first reagent fluid reservoir 112 to the fluidic device 102. In some examples, step 2010 comprises actuating a motor to rotate the flow control valve 104 to align and fluidly connect the valve selector channel 152 with a corresponding connecting channel 131 associated with the first reagent fluid reservoir 112. In some examples, step 2010 comprises using the pump 106 to move the first reagent fluid 122 from the first reagent fluid reservoir 112 to the fluidic device 102. In some examples, step 2010 comprises using the actuator to move the plunger of the syringe pump 106 in the first direction to generate a negative pressure differential to move the first reagent fluid 122 through the fluidic device 102.

Method 2000 may further comprise a step 2015 of moving a volume of fluid buffer into the fluidic device 102. In some examples, step 2015 includes a first part comprising moving a volume of the first fluid buffer 123 from the first fluid buffer reservoir 113 into the fluidic device 102. In some examples, the first part of step 2015 comprises setting the flow control valve 104 to permit fluid flow from the first fluid buffer reservoir 113 to the fluidic device 102 and using the pump 106 to move the first fluid buffer 123 from the first fluid buffer reservoir 113 to the fluidic device 102. In some examples, the first part of step 2015 comprises actuating the motor to rotate the flow control valve 104 to align and fluidly connect the valve selector channel 152 with a corresponding connecting channel 131 associated with the first fluid buffer reservoir 113. In some examples, the first part of step 2015 comprises using the actuator to move the plunger of the syringe pump 106 in the first direction to generate a negative pressure differential to move the first fluid buffer 123 through the fluidic device 102.

In some examples, step 2015 includes a second part comprising, after moving the first fluid buffer 123, moving a volume of the common fluid buffer 121 from the common fluid buffer reservoir 111 into the fluidic device 102. In some examples, the second part of step 2015 comprises setting the flow control valve 104 to permit fluid flow from the common fluid buffer reservoir 111 to the fluidic device 102 and using the pump 106 to move the common fluid buffer 121 from the common fluid buffer reservoir 111 to the fluidic device 102. In some examples, the second part of step 2015 comprises actuating the motor to rotate the flow control valve 104 to align and fluidly connect the valve selector channel 152 with a corresponding connecting channel 131 associated with the common fluid buffer reservoir 111. In some examples, the second part of step 2015 comprises using the actuator to move the plunger of the syringe pump 106 in the first direction to generate a negative pressure differential to move the common fluid buffer 121 through the fluidic device 102.

In some examples, the volume of first fluid buffer 123 moved from the first fluid buffer reservoir 113 is substantially equal to the volume of the common fluid buffer 121 moved from the common fluid buffer reservoir 111. In other instances, the volume of first fluid buffer 123 moved from the first fluid buffer reservoir 113 is greater than the volume of the common fluid buffer 121 moved from the common fluid buffer reservoir 111. In still other instances, the volume of first fluid buffer 123 moved from the first fluid buffer reservoir 113 is less than the volume of the common fluid buffer 121 moved from the common fluid buffer reservoir 111.

Method 2000 may further comprise a step 2020 of moving at least a portion of the volume of the fluid buffer moved in step 2015 into the first fluid buffer reservoir 113. In some examples, step 2020 comprises setting the flow control valve 104 to permit flow from the fluidic device 102 to the first fluid buffer reservoir 113. In some examples, step 2020 comprises actuating the motor to rotate the flow control valve 104 to align and fluidly connect the valve selector channel 152 with a corresponding connecting channel 131 associated with the first fluid buffer reservoir 113. In some examples, step 2020 comprises using the pump 106 to expel the fluid buffer from the fluidic device 102 to the first fluid buffer reservoir 113. In some examples, step 2020 comprises using the actuator to move the plunger of the syringe pump 106 in the second direction to generate a positive pressure differential to move the fluid buffer to the first fluid buffer reservoir 113. In some examples, the portion of fluid buffer moved to the first fluid buffer reservoir 113 in step 2020 ranges from about 30% to 70% of the total volume of fluid buffer moved into the fluidic device 102 in step 2015. For example, if 50 µL of first fluid buffer 123 is moved from the first fluid buffer reservoir 113 and 50 µL of common fluid buffer 121 moved from the common fluid buffer reservoir 111, then a volume of 30 µL to 70 µL of the combined 100 µL volume can be moved back into the first fluid buffer reservoir 113. In some instances, the volume moved back into the first fluid buffer reservoir 113 can be predominantly common fluid buffer 121 based on the common fluid buffer displacing the first fluid buffer 123 further downstream through the fluidic system.

Method 2000 may further comprise a step 2025 of moving an aliquot of second reagent fluid 124 into the fluidic device 102. In some examples, step 2025 comprises setting the flow control valve 104 to permit fluid flow from the second reagent fluid reservoir 114 to the fluidic device 102. In some examples, step 2025 comprises actuating the motor to rotate the flow control valve 104 to align and fluidly connect the valve selector channel 152 with a corresponding connecting channel 131 associated with the second reagent fluid reservoir 114. In some examples, step 2025 comprises using the pump 106 to move the second reagent fluid 124 from the second reagent fluid reservoir 114 to the fluidic device 102. In some examples, step 2025 comprises using the actuator to move the plunger of the syringe pump 106 in the first direction to generate a negative pressure differential to move the second reagent fluid 124 through the fluidic device 102.

Method 2000 may further comprise a second step 2030 of moving a volume of fluid buffer into the fluidic device 102. In some examples, step 2030 includes a first part comprising moving a volume of the second fluid buffer 125 from the second fluid buffer reservoir 115 into the fluidic device 102. In some examples, the first part of step 2030 comprises setting the flow control valve 104 to permit fluid flow from the second fluid buffer reservoir 115 to the fluidic device 102 and using the pump 106 to move the second fluid buffer 125 from the second fluid buffer reservoir 115 to the fluidic device 102. In some examples, the first part of step 2030 comprises actuating the motor to rotate the flow control valve 104 to align and fluidly connect the valve selector channel 152 with a corresponding connecting channel 131 associated with the second fluid buffer reservoir 115. In some examples, the first part of step 2030 comprises using the actuator to move the plunger of the syringe pump 106 in the first direction to generate a negative pressure differential to move the second fluid buffer 125 through the fluidic device 102.

In some examples, step 2030 includes a second part comprising, after moving the second fluid buffer 125, moving a volume of the common fluid buffer 121 from the common fluid buffer reservoir 111 into the fluidic device 102. In some examples, the second part of step 2030 comprises setting the flow control valve 104 to permit fluid flow from the common fluid buffer reservoir 111 to the fluidic device 102 and using the pump 106 to draw the volume of the common fluid buffer 121 from the common fluid buffer reservoir 111 to the fluidic device 102. In some examples, the second part of step 2030 comprises actuating the motor to rotate the flow control valve 104 to align and fluidly connect the valve selector channel 152 with a corresponding connecting channel 131 associated with the common fluid buffer reservoir 111. In some examples, the second part of step 2030 comprises using the actuator to move the plunger of the syringe pump 106 in the first direction to generate a negative pressure differential to move the common fluid buffer 121 through the fluidic device 102.

Method 2000 may further comprise a step 2035 of moving at least a portion of the volume of the fluid buffer moved in step 2030 into the second fluid buffer reservoir 115. In some examples, step 2035 comprises setting the flow control valve 104 to permit flow from the fluidic device 102 to the second fluid buffer reservoir 115. In some examples, step 2035 comprises actuating the motor to rotate the flow control valve 104 to align and fluidly connect the valve selector channel 152 with a corresponding connecting channel 131 associated with the second fluid buffer reservoir 115. In some examples, step 2035 comprises using the pump 106 to expel the fluid buffer from the fluidic device 102 to the second fluid buffer reservoir 115. In some examples, step 2035 comprises using the actuator to move the plunger of the syringe pump 106 in the second direction to generate a positive pressure differential to move the fluid buffer to the second fluid buffer reservoir 115. In some examples, the portion of fluid buffer moved to the second fluid buffer reservoir 115 in step 2035 ranges from about 30% to 70% of the total volume of fluid buffer moved into the fluidic device 102 in step 2030. For example, if 50 µL of second fluid buffer 125 is moved from the second fluid buffer reservoir 115 and 50 µL of common fluid buffer 121 moved from the common fluid buffer reservoir 111, then a volume of 30 µL to 70 µL of the combined 100 µL volume can be moved back into the second fluid buffer reservoir 115. In some instances, the volume moved back into the second fluid buffer reservoir 115 can be predominantly common fluid buffer 121 based on the common fluid buffer displacing the second fluid buffer 125 further downstream through the fluidic system.

Method 2000 may further comprise a step 2040 of re-using the first reagent fluid 122 by moving an aliquot of the first reagent fluid 122 into the fluidic device 102. In some examples, step 2040 comprises setting the flow control valve 104 to permit fluid flow from the first reagent fluid reservoir 112 to the fluidic device 102. In some examples, step 2040 comprises actuating the motor to rotate the flow control valve 104 to align and fluidly connect the valve selector channel 152 with a corresponding connecting channel 131 associated with the first reagent fluid reservoir 112. In some examples, step 2040 comprises using the pump 106 to move the first reagent fluid 122 from the first reagent fluid reservoir 112 to the fluidic device 102. In some examples, step 2040 comprises using the actuator to move the plunger of the syringe pump 106 in the first direction to generate a negative pressure differential to move the first reagent fluid 122 through the fluidic device 102

Method 2000 may further comprise a step 2045 of re-using the first fluid buffer by moving a volume of fluid buffer into the fluidic device 102, where at least a portion of the volume of fluid buffer moved in step 2045 is moved from the first fluid buffer reservoir 113, which now includes used fluid buffer moved to first fluid buffer reservoir 113 in step 2020. In some examples, step 2045 includes a first part comprising setting the flow control valve 104 to permit fluid flow from the first fluid buffer reservoir 113 to the fluidic device 102. In some examples, the first part of step 2045 comprises setting the flow control valve 104 to permit fluid flow from the first fluid buffer reservoir 113 to the fluidic device 102 and using the pump 106 to move the first fluid buffer 123 from the first fluid buffer reservoir 113 to the fluidic device 102. In some examples, the first part of step 2045 comprises actuating the motor to rotate the flow control valve 104 to align and fluidly connect the valve selector channel 152 with a corresponding connecting channel 131 associated with the first fluid buffer reservoir 113. In some examples, the first part of step 2045 comprises using the actuator to move the plunger of the syringe pump 106 in the first direction to generate a negative pressure differential to move the first fluid buffer 123 through the fluidic device 102.

In some examples, step 2045 includes a second part comprising, after moving the first fluid buffer 123, moving a volume of the common fluid buffer 121 from the common fluid buffer reservoir 111 into the fluidic device 102. In some examples, the second part of step 2045 comprises setting the flow control valve 104 to permit fluid flow from the common fluid buffer reservoir 111 to the fluidic device 102 and using the pump 106 to move the common fluid buffer 121 from the common fluid buffer reservoir 111 to the fluidic device 102. In some examples, the second part of step 2045 comprises actuating the motor to rotate the flow control valve 104 to align and fluidly connect the valve selector channel 152 with a corresponding connecting channel 131 associated with the common fluid buffer reservoir 111. In some examples, the second part of step 2045 comprises using the actuator to move the plunger of the syringe pump 106 in the first direction to generate a negative pressure differential to move the common fluid buffer 121 through the fluidic device 102. In some examples, the volume of first fluid buffer 123 moved from the first fluid buffer reservoir 113 is substantially equal to the volume of the common fluid buffer 121 moved from the common fluid buffer reservoir 111.

In some examples, if the first fluid buffer 123 is to be further re-used after step 2045, the method comprises a step of moving at least a portion of the volume fluid buffer moved in step 2045 back into the first fluid buffer reservoir 113, as in step 2020 above. In some examples, the step of moving at least a portion of the volume fluid buffer moved in step 2045 back into the first fluid buffer reservoir 113 comprises setting the flow control valve 104 to permit flow from the fluidic device 102 to the first fluid buffer reservoir 113. In some examples, the step of moving at least a portion of the volume fluid buffer moved in step 2045 back into the first fluid buffer reservoir 113 comprises actuating the motor to rotate the flow control valve 104 to align and fluidly connect the valve selector channel 152 with a corresponding connecting channel 131 associated with the first fluid buffer reservoir 113. In some examples, the step of moving at least a portion of the volume fluid buffer moved in step 2045 back into the first fluid buffer reservoir 113 comprises using the actuator to move the plunger of the syringe pump 106 in the second direction to generate a positive pressure differential to move the fluid buffer to the first fluid buffer reservoir 113. In some examples, the portion of fluid buffer moved from the first fluid buffer reservoir 113 in step 2045 ranges from about 30% to 70% of the volume of the fluid buffer moved into the fluidic device 102 in step 2045.

Method 2000 may further comprise a step 2050 of re-using the second reagent fluid 124 by moving an aliquot of the second reagent fluid 124 into the fluidic device 102. In some examples, step 2050 comprises setting the flow control valve 104 to permit fluid flow from the second reagent fluid reservoir 114 to the fluidic device 102. In some examples, step 2050 comprises actuating the motor to rotate the flow control valve 104 to align and fluidly connect the valve selector channel 152 with a corresponding connecting channel 131 associated with the second reagent fluid reservoir 114. In some examples, step 2050 comprises using the pump 106 to draw move the second reagent fluid 124 from the second reagent fluid reservoir 114 to the fluidic device 102. In some examples, step 2050 comprises using the actuator to move the plunger of the syringe pump 106 in the first direction to generate a negative pressure differential to move the second reagent fluid 124 through the fluidic device 102.

Method 2000 may further comprise a step 2055 of re-using the second fluid buffer by moving a volume of fluid buffer into the fluidic device 102, where at least a portion of the volume of fluid buffer moved in step 2055 is moved from the second fluid buffer reservoir 115, which now includes used fluid buffer moved to second fluid buffer reservoir 115 in step 2035. In some examples, step 2055 includes a first part comprising setting the flow control valve 104 to permit fluid flow from the second fluid buffer reservoir 115 to the fluidic device 102. In some examples, the first part of step 2055 comprises setting the flow control valve 104 to permit fluid flow from the second fluid buffer reservoir 115 to the fluidic device 102 and using the pump 106 to move the second fluid buffer 125 from the second fluid buffer reservoir 115 to the fluidic device 102. In some examples, the first part of step 2055 comprises actuating the motor to rotate the flow control valve 104 to align and fluidly connect the valve selector channel 152 with a corresponding connecting channel 131 associated with the second fluid buffer reservoir 115. In some examples, the first part of step 2055 comprises using the actuator to move the plunger of the syringe pump 106 in the first direction to generate a negative pressure differential to move the second fluid buffer 125 through the fluidic device 102.

In some examples, step 2055 includes a second part comprising, after moving the second fluid buffer 125, moving a volume of the common fluid buffer 121 from the common fluid buffer reservoir 111 into the fluidic device 102. In some examples, the second part of step 2055 comprises setting the flow control valve 104 to permit fluid flow from the common fluid buffer reservoir 111 to the fluidic device 102 and using the pump 106 to move the common fluid buffer 121 from the common fluid buffer reservoir 111 to the fluidic device 102. In some examples, the second part of step 2055 comprises actuating the motor to rotate the flow control valve 104 to align and fluidly connect the valve selector channel 152 with a corresponding connecting channel 131 associated with the common fluid buffer reservoir 111. In some examples, the second part of step 2055 comprises using the actuator to move the plunger of the syringe pump 106 in the first direction to generate a negative pressure differential to move the common fluid buffer 121 through the fluidic device 102. In some examples, the volume of second fluid buffer 125 moved from the second fluid buffer reservoir 115 is substantially equal to the volume of the common fluid buffer 121 moved from the common fluid buffer reservoir 111.

In some examples, if the second fluid buffer 125 is to be further re-used after step 2055, the method comprises a step of moving at least a portion of the volume fluid buffer moved in step 2055 back into the second fluid buffer reservoir 115, as in step 2035. In some examples, the step of moving at least a portion of the volume fluid buffer moved in step 2055 back into the second fluid buffer reservoir 115 comprises setting the flow control valve 104 to permit flow from the fluidic device 102 to the second fluid buffer reservoir 115. In some examples, the step of moving at least a portion of the volume fluid buffer moved in step 2055 back into the second fluid buffer reservoir 115 comprises actuating the motor to rotate the flow control valve 104 to align and fluidly connect the valve selector channel 152 with a corresponding connecting channel 131 associated with the second fluid buffer reservoir 115. In some examples, the step of moving at least a portion of the volume fluid buffer moved in step 2055 back into the second fluid buffer reservoir 115 comprises using the actuator to move the plunger of the syringe pump 106 in the second direction to generate a positive pressure differential to move the fluid buffer to the second fluid buffer reservoir 115.

Processing Instrument

Figure 21:
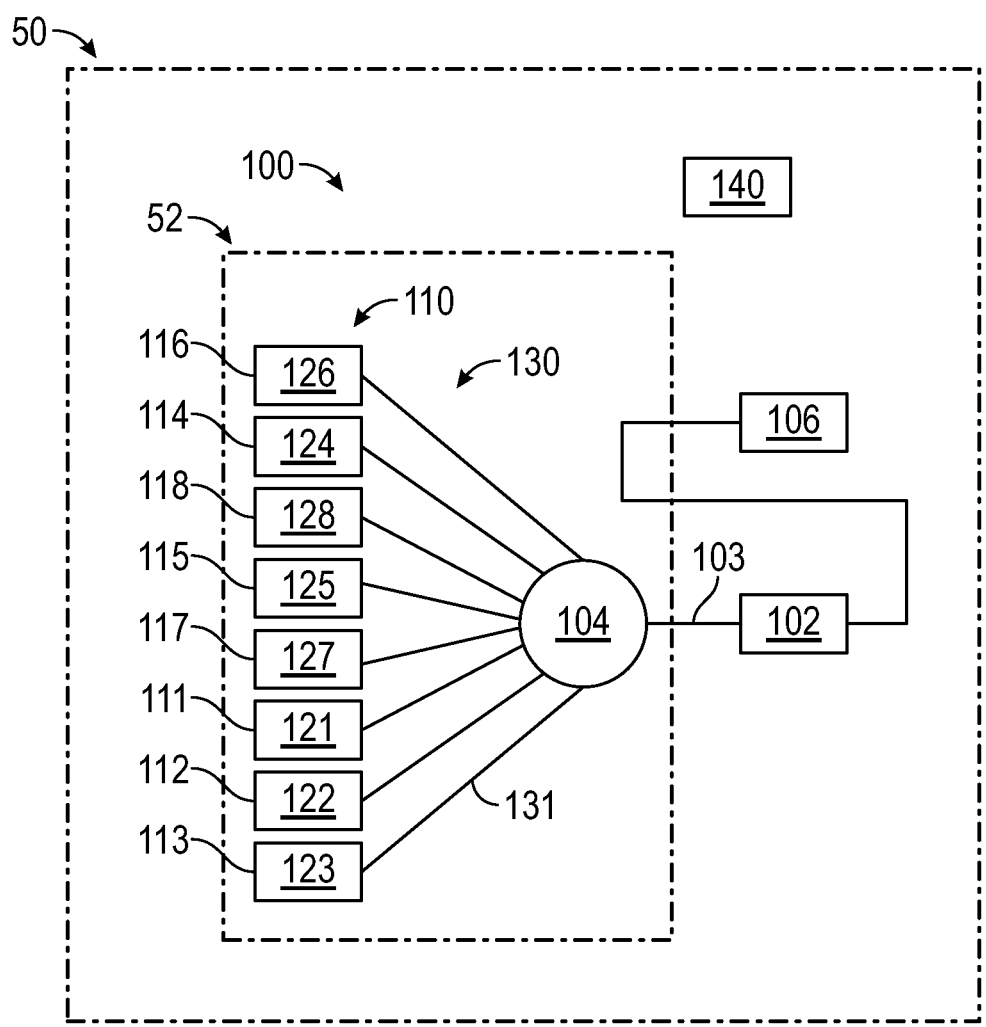
FIG. 21 is a schematic diagram of the system comprising a fluid cartridge incorporated into a processing instrument.

As schematically shown in FIG. 21, in some examples, the system 100 includes a fluid cartridge 52 supporting various components of the system 100, such as, the fluidic device 102, the flow control valve 104, the pump 106, and the set of fluid reservoirs 110 The fluid cartridge 52 may be operatively installed into a processing instrument 50. In some examples, the fluid cartridge 52 includes the inlet channel 103, the flow control valve 104, at least part of the outlet channel 105, the set of fluid reservoirs 110, and the set of connecting channels 130. The fluidic device 102 may be operatively coupled to the instrument 50, and the instrument 50 may include one or more actuators (e.g., motor) to control the position of flow control valve 104 and the pressure applied by the pump 106 to select and move various reagent fluids and fluid buffers. Instrument 50 may further include a waste outlet (not shown) to dispose any used reagent fluid or fluid buffer. Controller 140, which may be part of the instrument 50 or may be a standalone or remote computer resource operatively connected to the instrument 50, controls operation of the instrument 50 (e.g., processing of the fluidic device 102 and operation of the pump 106) and operation of the fluid cartridge 52 (e.g., operation of the flow control valve 104).

Hardware and Software

Aspects of the disclosure are implemented via control and computing hardware components, user-created software, data input components, and data output components. Hardware components include computing and control modules (e.g., system controller(s)), such as microprocessors and computers, configured to effect computational and/or control steps by receiving one or more input values, executing one or more algorithms, as the algorithm described in FIG. 20, stored on non-transitory machine-readable media (e.g., software) that provide instruction for manipulating or otherwise acting on the input values, and output one or more output values. Such outputs may be displayed or otherwise indicated to a user for providing information to the user, for example information as to the status of the instrument or a process being performed thereby, or such outputs may comprise inputs to other processes and/or control algorithms. Data input components comprise elements by which data is input for use by the control and computing hardware components. Such data inputs may comprise positions sensors, motor encoders, as well as manual input elements, such as graphic user interfaces, keyboards, touch screens, microphones, switches, manually-operated scanners, voice-activated input, etc. Data output components may comprise hard drives or other storage media, graphic user interfaces, monitors, printers, indicator lights, or audible signal elements (e.g., buzzer, horn, bell, etc.). Software comprises instructions stored on non-transitory computer-readable media which, when executed by the control and computing hardware, cause the control and computing hardware to perform one or more automated or semi-automated processes.

In some examples, the apparatus may include a control system including a computer controller 140 (schematically represented in FIGS. 1-19). Controller 140 may be a control system or computer connected to any one of the devices of the system 100, e.g., a stand-alone computer, or may include computer components integrated with any one of the devices of the system 100, e.g., an application specific integrated circuit. These computer components can include one or more microprocessors, displays, keyboards (and/or other user input devices), memory components, printer(s), and/or other devices. Controller 140 may be configured to receive inputs from a user (e.g., user-inputs) and/or feedback devices, such as pressure sensors, flow meters, etc., and manage the performance of the fluid operations of the system 100. Controller 140 may include software algorithms to implement processes, such as a process implementing the method 2000 shown in FIG. 20, that enable a user to enter user-defined parameters related to fluid processing operations into the fluidic device 102 of the system 100, schedule different fluid processing operations on the fluidic device 102 of the system 100, and/or cause the controller 140 to perform the different steps associated with the fluid processing operations, monitor the performance of the fluid processing operations, and/or output results (on display, printout, etc.) for the user.

As shown in FIGS. 1-19, the controller 140 is in electrical communication with the flow control valve 104, the pump 106 (indicated by the dashed lines), and/or intermediary devices configured to control the flow control valve 104 and/or the pump 106 (e.g., a step motor for the flow control valve 104, a motor for the pump 106, etc.) such that the controller 140 may send instructions to control the control valve 104 and the pump 106 to perform different steps associated with the fluid processing operations (e.g., the processes associated with FIGS. 2-19 and/or the method of FIG. 20). In some examples, the controller 140 is configured to transmit a command for the flow control valve 104 to fluidly connect a selected fluid reservoir of the set of reservoirs 110 to the inlet channel 103 so that the fluid from the selected fluid reservoir may flow through the corresponding connecting channel 131, the flow control valve 104, the inlet channel 103, the fluidic device 102, the outlet channel 105, and/or a chamber of the pump 106. In some examples, the controller 140 is configured to transmit a command to the pump 106 to move in the first or second direction to generate a pressure differential between the any one of the set of the fluid reservoirs 110 and the outlet channel 105 to drive fluid flow towards or away from the pump 106.

In some examples, the controller 140 is configured to access a computer readable medium encoded with computer-executable instructions to perform the different processes described herein. In some examples, by executing the instructions encoded in the computer readable medium, the controller 140 causes the system 100 to execute the methods and processes, or portions thereof, described herein, including: (a) move an aliquot of first reagent fluid into the fluidic device; (b) after process (a), move a volume of fluid buffer into the fluidic device; (c) after process (b), move at least a portion of the volume of fluid buffer moved in process (b) into a first fluid buffer reservoir; (d) after process (c), move an aliquot of second reagent fluid into the fluidic device; (e) after process (d), move a volume of fluid buffer into the fluidic device; and/or, (f) after process (e), move at least a portion of the volume of fluid buffer moved in process (e) into a second fluid buffer reservoir.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system comprising:
a fluidic device;
a first reagent fluid reservoir fluidly connectable to the fluidic device;
a first fluid buffer reservoir fluidly connectable to the fluidic device;
a common fluid buffer source fluidly connectable to the fluidic device;
a pump;
a flow control valve for selectively connecting one of the first reagent fluid reservoir, the first fluid buffer reservoir, and the common fluid buffer source to the fluidic device; and
a controller in operative communication with the pump and the flow control valve and programmed to control the pump and the flow control valve to sequentially:
(i) effect fluid flow from the first reagent fluid reservoir to the fluidic device,
(ii) effect fluid flow from the common fluid buffer source to the fluidic device,
(iii) effect fluid flow from the fluidic device to the first fluid buffer reservoir,
(iv) effect fluid flow from the first reagent fluid reservoir to the fluidic device, and
(v) effect fluid flow from the first fluid buffer reservoir to the fluidic device.

2. The system of claim 1 further comprising:
a second reagent fluid reservoir fluidly connectable to the fluidic device; and
a second fluid buffer reservoir fluidly connectable to the fluidic device;
wherein the flow control valve is for selectively connecting one of the first reagent fluid reservoir, the first fluid buffer reservoir, the common fluid buffer source, the second reagent fluid reservoir, and the second fluid buffer reservoir to the fluidic device;
wherein the controller is further programmed to control the pump and the flow control valve to sequentially:
(vi) effect fluid flow from the second reagent fluid reservoir to the fluidic device,
(vii) effect fluid flow from the common fluid buffer source to the fluidic device,
(viii) effect fluid flow from the fluidic device to the second fluid buffer reservoir,
(ix) effect fluid flow from the second reagent fluid reservoir to the fluidic device, and
(x) effect fluid flow from the second fluid buffer reservoir to the fluidic device.

3. The system of claim 1, wherein the first fluid buffer reservoir comprises a cache channel comprising a consistent cross-sectional dimension across a length thereof.

4. The system of claim 1, wherein the first fluid buffer reservoir is fluidly connected to the fluidic device by a channel, and the first fluid buffer reservoir comprises a cache reservoir comprising a cross-sectional dimension larger than a cross-sectional dimension of the channel.

5. The system of claim 1, wherein the flow control valve is a rotary valve.

6. The system of claim 1 wherein the controller is in electrical communication with the flow control valve for transmitting commands controlling operation of the flow control valve.

7. The system of claim 1, wherein the first fluid buffer reservoir holds a first volume of fluid that is at least 30% of a volume of fluid held by the fluidic device.

8. A system comprising:
a fluidic device;
a first reagent fluid reservoir fluidly connectable to the fluidic device;
a first fluid buffer reservoir fluidly connectable to the fluidic device;
a common fluid buffer source fluidly connectable to the fluidic device;
a second reagent fluid reservoir fluidly connectable to the fluidic device;
a second fluid buffer reservoir fluidly connectable to the fluidic device;
a flow control valve for selectively connecting, one at a time, each of the first reagent fluid reservoir, the first fluid buffer reservoir, the common fluid buffer source, the second reagent fluid reservoir, and the second fluid buffer reservoir to the fluidic device;
a pump; and
a controller in operative communication with the pump and the flow control valve and programmed to control the pump and the flow control valve to perform the following system processes:
(a) move an aliquot of first reagent fluid from the first reagent fluid reservoir into the fluidic device;
(b) after process (a), move a volume of fluid buffer into the fluidic device from at least one of the common fluid buffer source and the first fluid buffer reservoir;
(c) after process (b), move at least a portion of the volume of fluid buffer moved in process (b) from the fluidic device into the first fluid buffer reservoir;
(d) after process (c), move an aliquot of second reagent fluid from the second reagent fluid reservoir into the fluidic device;
(e) after process (d), move a volume of fluid buffer into the fluidic device from at least one of the common fluid buffer source and the second fluid buffer reservoir;
(f) after process (e), move at least a portion of the volume of fluid buffer moved in process (e) from the fluidic device into the second fluid buffer reservoir;
(g) after process (f), move an aliquot of the first reagent fluid from the first reagent fluid reservoir into the fluidic device;
(h) after process (g), move a volume of fluid buffer into the fluidic device, wherein at least a portion of the volume of fluid buffer moved in process (h) is moved from the first fluid buffer reservoir;
(i) after process (h), move an aliquot of the second reagent fluid from the second reagent fluid reservoir into the fluidic device; and
(j) after process (i), move a volume of fluid buffer into the fluidic device, wherein at least a portion of the volume of fluid buffer moved in process (j) is moved from the second fluid buffer reservoir.

9. The system of claim 8, wherein the controller is configured to control the pump and the flow control valve to perform the following, additional system processes:
(k) after process (h) and before process (i), moving at least a portion of the volume of fluid buffer moved in process (h) from the fluidic device into the first fluid buffer reservoir; and
(l) after process (j), moving at least a portion of the volume of fluid buffer moved in process (j) from the fluidic device into the second fluid buffer reservoir.

10. The system of claim 8, wherein process (b) comprises moving a portion of the volume of fluid buffer from the first fluid buffer reservoir into the fluidic device, and thereafter, moving a portion of the volume of fluid buffer from the common fluid buffer reservoir into the fluidic device, and
wherein process (e) comprises moving a portion of the volume of fluid buffer from the second fluid buffer reservoir into the fluidic device, and thereafter, moving a portion of the volume of fluid buffer from the common fluid buffer reservoir into the fluidic device.

11. The system of claim 10, wherein during process (b), the portion of the volume of fluid buffer moved from the first fluid buffer reservoir into the fluidic device is substantially equal to the portion of the volume of fluid buffer moved from the common fluid buffer reservoir into the fluidic device.

12. The system of claim 8, wherein process (b) comprises moving the volume of fluid buffer from the first fluid buffer reservoir into the fluidic device; and
wherein process (e) comprises moving the volume of fluid buffer from the second fluid buffer reservoir into the fluidic device.

13. The system of claim 8, wherein the portion of fluid buffer moved to the first fluid buffer reservoir in process (c) ranges from about 30% to 70% of the volume of fluid buffer moved in process (b).

14. The system of claim 8, wherein in process (h), the portion of fluid buffer moved from the first fluid buffer reservoir ranges from about 30% to 70% of the volume of fluid buffer moved into the fluidic device.

15. The system of claim 8, wherein in process (d), the aliquot of the second reagent is not mixed with the aliquot of the first reagent in the fluidic device.

16. The system of claim 8, wherein the controller is configured to control the pump and the flow control valve to perform the following, additional system process:
(m) after process (a) and before process (b), move at least a portion of the aliquot of first reagent fluid moved in process (a) from the fluidic device into the first reagent fluid reservoir.

17. The system of claim 16, wherein the controller is configured to control the pump and the flow control valve to perform the following, additional system process:
(n) after process (d) and before process (e), move at least a portion of the aliquot of second reagent fluid moved in process (d) from the fluidic device into the second reagent fluid reservoir.

* * * * *